United States Patent [19]
Lifshitz et al.

[11] Patent Number: 6,055,064
[45] Date of Patent: Apr. 25, 2000

[54] METHOD FOR CONVERSION OF A COLOR ELECTRONIC PRE-PRESS SYSTEM DATA FILE TO A PAGE DESCRIPTION LANGUAGE DATA FILE

[75] Inventors: Lior Lifshitz, Maoz Zion; Raphael Wiesenberg, Tel Aviv, both of Israel

[73] Assignee: Shira Computers Ltd., Kfar Saba, Israel

[21] Appl. No.: 08/852,627

[22] Filed: May 7, 1997

[51] Int. Cl.[7] .................................................. G06F 15/00
[52] U.S. Cl. ...................... 358/1.9; 358/1.12; 358/1.13; 358/261.1; 707/523
[58] Field of Search .................................. 395/101, 109, 395/111, 112, 785, 144, 145, 108, 110, 113, 114; 358/261.1, 261.2, 261.3, 1.1, 1.9, 1.12, 1.13, 1.8, 1.14, 1.15, 6.11; 707/523; 345/467, 468

[56] References Cited

U.S. PATENT DOCUMENTS

| | | |
|---|---|---|
| 4,149,165 | 4/1979 | Herman et al. . |
| 4,500,919 | 2/1985 | Schreiber . |
| 4,698,688 | 10/1987 | Ochi et al. . |
| 4,722,064 | 1/1988 | Suzuki . |
| 4,918,624 | 4/1990 | Moore et al. . |
| 4,928,243 | 5/1990 | Hodges et al. . |
| 4,975,858 | 12/1990 | Ikenoue et al. . |
| 5,113,249 | 5/1992 | Yosefi . |
| 5,131,058 | 7/1992 | Ting et al. . |
| 5,146,346 | 9/1992 | Knoll . |
| 5,150,453 | 9/1992 | Hala et al. . |
| 5,150,455 | 9/1992 | Morikawa et al. . |
| 5,293,539 | 3/1994 | Spence . |
| 5,296,935 | 3/1994 | Bresler . |
| 5,327,527 | 7/1994 | Hatayama . |
| 5,337,319 | 8/1994 | Furukawa et al. . |
| 5,359,673 | 10/1994 | de La Beaujardiere . |
| 5,752,057 | 5/1998 | Lifshitz et al. .......................... 395/785 |

FOREIGN PATENT DOCUMENTS 557-008 A2  10/1993  European Pat. Off. .

*Primary Examiner*—Dov Popovici
*Assistant Examiner*—Mark Wallerson
*Attorney, Agent, or Firm*—Mark M. Friedman

[57] ABSTRACT

A method for the conversion of an CEPS image data file to a vector dominated Page Description Language (PDL) file. The CEPS image data file can include LineWork image data, Continuous Tone image data and High resolution Continuous Tone (HC) data. The Page Description Language file can be realized as a composite file or a separated file.

80 Claims, 35 Drawing Sheets

Linework

Rows: 20 Columns: 20

| Color Index | Cyan | Magenta | Yellow | Black |
|---|---|---|---|---|
| 1 (=White) | 0 | 0 | 0 | 0 |
| 2 (=Blue) | 255 | 255 | 0 | 0 |
| 3 (=Red) | 0 | 255 | 255 | 0 |
| 4 (=Red) | 0 | 255 | 255 | 0 |
| 5 (=Blue) | 255 | 255 | 0 | 0 |
| 6 (=Red) | 0 | 255 | 255 | 0 |

Run length list:

*Runs describing element 14*

| Line0: | (0,20) |
| Line1: | (1,20) |
| Line2: | (1,14),(2,1),(1,5) |
| Line3: | (1,13),(2,3),(1,4) |
| Line4: | (1,4),(3,10),(2,3),(1,3) |
| Line5: | (1,4),(3,10),(2,4),(1,2) |
| Line6: | (5,1),(1,5),(3,10),(1,6) |
| Line7: | (5,2),(1,2),(3,10),(1,6) |
| Line8: | (5,3),(1,17) |
| Line9: | (5,4),(1,16) |
| Line10: | (5,5),(1,15) |
| Line11: | (5,6),(1,14) |
| Line12: | (5,7),(1,7),(4,4),(1,2) |
| Line13: | (5,8),(1,6),(4,4),(1,2) |
| Line14: | (5,9),(1,5),(4,4),(1,2) |
| Line15: | (5,10),(1,4),(4,4),(1,2) |
| Line16: | (5,11),(1,9) |
| Line17: | (5,12),(1,8) |
| Line18: | (6,20) |
| Line19: | (6,20) |

FIG. 2

NATIVE COMPOSITES PS 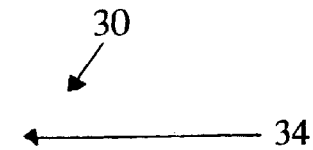
```
% beging prolog
/M {moveto} bind def
/L {lineto} bind def
% end prolog
```

```
% begin setup
% define colors of elements used on page
/l1 {0000} def      % white
/l2 {1100} def      % blue
/l3 {0110} def      % red
/l4 {0110} def      % red
/l5 {1100} def      % blue
/l6 {0110} def      % red
% match page y-axis & PS y-axis
0 2 1 translate 1-1 scale
/DeviceCMYK setcolorspace
% end setup
```
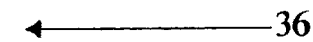

```
l1 setcolor
0 0 M 0 20 L 20 20 L 20 0 L closepath
fill                    % draw l1
```

```
l2 setcolor
14 2 M 17 5 L 11 5 L closepath
fill                    % draw l2
```

```
l3 setcolor
4 4 M 14 4 L 14 8 L 4 8 L closepath
fill                    % draw l3
```

```
l4 setcolor
14 12 M 18 12 L 18 16 L 14 16 L closepath
fill                    % draw l4
```

```
l5 setcolor
0 6 M 12 18 L 0 18 L closepath
fill                    % draw l5
```

```
l6 setcolor
0 18 M 20 18 L 20 20 L 0 20 L closepath
fill                    % draw l6
```
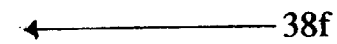

showpage

FIG. 3

NATIVE SEPARATED POSTSCRIPT  ⟵ 32

% begin prolog
/M {moveto} bind def
/L {lineto} bind def                                    ⟵ 40
% end prolog % begin setup emcompassing all separations
/NewYAxis {
         % match LW & PS y-axis
         0 21 translate 1 -1 scale
       } bind def
/DeviceGray setcolorspace
%end setup encompassing all separations       ⟵ 42

% begin setup of cyan separation
/l1  1 def      % cyan component of white
/l2  0 def      % cyan component of blue
/l3  1 def      % cyan component of red
/l4  1 def      % cyan component of red
/l5  0 def      % cyan component of blue
/l6  1 def      % cyan component of red
NewYAxis                                         ⟵ 44a
% end setup of cyan separation % begin script of cyan separation
l1 setcolor
0 0 M 0 20 L 20 20 L 20 0 L closepath
fill            % draw l1                        ⟵ 44
l2 setcolor
14 2 M 17 5 L 11 5 L
closepath fill    % draw l2
l3 setcolor
4 4 M 14 4 L 14 8 L 4 8 L
closepath fill    % draw l3
l4 setcolor                                      ⟵ 44b
14 12 M 18 12 L 18 16 L 14 16 L
closepath fill    % draw l4
l5 setcolor
0 6 M 12 18 L 0 18 L
closepath fill    % draw l5
l6 setcolor
0 18 M 20 18 L 20 20 L 0 20 L
closepath fill    % draw l6
showpage          % draw the cyan page
% end script of cyan separation

FIG. 4A

% begin setup of magenta separation
/I1 1 def    % magenta component of white
/I2 0 def    % magenta component of blue
/I3 0 def    % magenta component of red
/I4 0 def    % magenta component of red
/I5 0 def    % magenta component of blue
/I6 0 def    % magenta component of red
NewYAxis  ← 46a
% end setup of magenta separation  ← 46

% begin script of magenta separation
...identical to script of cyan page  ← 46b
% end script of magenta separation % begin setup of yellow separation
/I1 1 def    % yellow component of white
/I2 1 def    % yellow component of blue
/I3 0 def    % yellow component of red
/I4 0 def    % yellow component of red  ← 48a
/I5 1 def    % yellow component of blue
/I6 0 def    % yellow component of red
NewYAxis
% end setup of yellow separation  ← 48

% begin script of yellow separation
...identical to script of cyan page  ← 48b
% end script of yellow separation % begin setup of black separation
/I1 1 def    % black component of white
/I2 1 def    % black component of blue
/I3 1 def    % black component of red
/I4 1 def    % black component of red  ← 50a
/I5 1 def    % black component of blue
/I6 1 def    % black component of red
NewYAxis
% end setup of black separation  ← 50

% begin script of black separation
...identical to script of cyan page  ← 50b
% end script of black separation

FIG. 4B

CEPS CT+LW
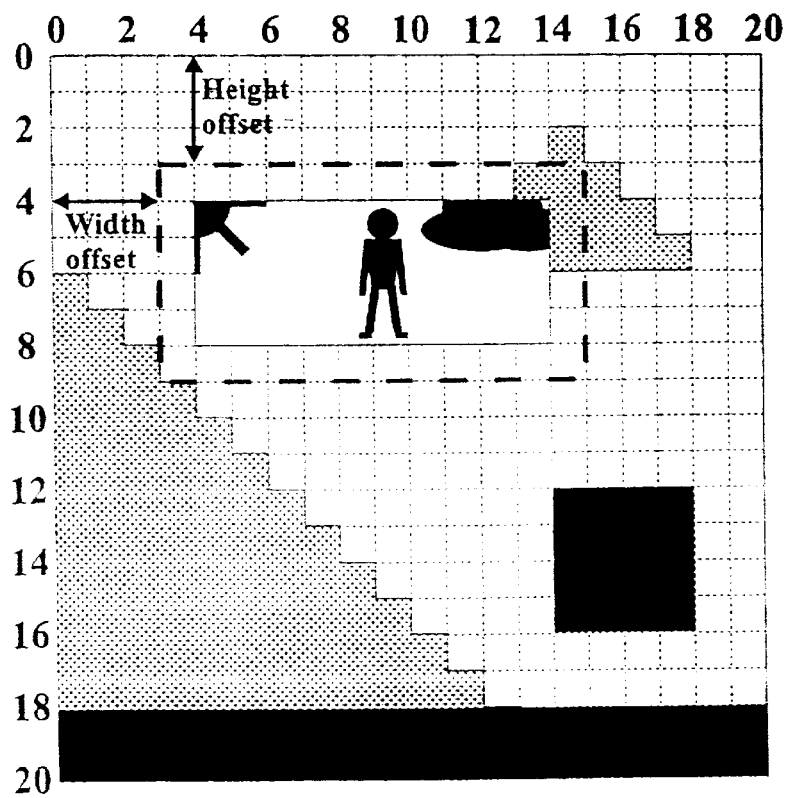
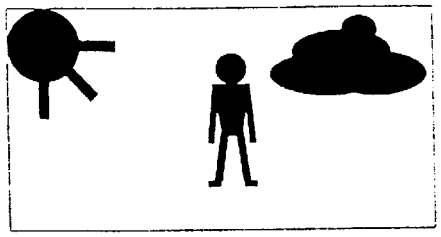
FIG. 5

Linework File

Rows: 20 Columns: 20

| Color Index | Cyan | Magenta | Yellow | Black | T= Transparent component |
|---|---|---|---|---|---|
| Black | | | | | |
| 1 | 0 | 0 | 0 | 0 | |
| 2 | 255 | 255 | 0 | 0 | |
| 3 | 0 T | 255 T | 255 T | 0 T | |
| 4 | 0 | 255 | 255 | 0 | |
| 5 | 255 | 255 | 0 | 0 | ← 60 |
| 6 | 0 | 255 | 255 | 0 | |

Line0:      (0,20)
Line1:      (1,20)
Line2:      (1,14),(2,1),(1,5)
Line3:      (1,13),(2,3),(1,4)
Line4:      (1,4),(3,10),(2,3),(1,3)           ← 56
Line5:      (1,4),(3,10),(2,4),(1,2)
Line6:      (5,1),(1,3),(3,10),(1,6)
Line7:      (5,2),(1,2),(3,10),(1,6)
Line8:      (5,3),(1,17)
Line9:      (5,4),(1,16)           ← 61
Line10:     (5,5),(1,15)
Line11:     (5,6),(1,14)
Line12:     (5,7),(1,7),(4,4),(1,2)
Line13:     (5,8),(1,6),(4,4),(1,2)
Line14:     (5,9),(1,5),(4,4),(1,2)
Line15:     (5,10),(1,4),(4,4),(1,2)
Line16:     (5,11),(1,9)
Line17:     (5,12),(1,8)
Line18:     (6,20)
Line19:     (6,20)

CT File image size: rows=6 columns=12
offset (relative to LW: height=3 width=3

Binary data for this CT image

← 58

NATIVE COMPOSITE POSTSCRIPT CONTAINING
IMAGE AND VECTOR DATA                        62

% begin prolog
/M { moveto } bind def          ← 64
/L {lineto } bind def
% end prolog % begin setup
/l1 { 0000} def                 % white
/l2 { 1100} def                 % blue
/l4 { 0110} def                 % red
/l5 { 1100} def                 % blue
/l6 { 0110} def                 % red
/DeviceCMYK setcolorspace
/temp1 12 string def
/temp2 12 string def
/temp3 12 string def                          66
/temp4 12 string def                        ←
/CTImageDict 8 dict def
CTImageDict begin               % standard image dict
/Image Type            1 def
   /Width                 12 def
   /Height                6 def
   /BitsPerComponent      8 def
   /ImageMatrix           [12 0 0 6 0 0] def
   /MultipleDataSources   true def
   /DataSource            [{currentfile temp1 readhexstring pop}
                           {currentfile temp2 readhexstring pop}
                           {currentfile temp3 readhexstring pop}
                           {currentfile temp4 readhexstring pop}] def
   /Decode                [0 1 0 1 0 1 0 1] def
end
0 21 translate 1 -1scale         % match page y-axis & PS y-axis
% end setup

FIG. 7 A

```
I1 setcolor
0 0 M 0 20 L 20 20 L 20 0 L closepath          68a
fill                    % draw I1
I2 setcolor
14 2 M 17 5 L 11 5 L                            68b          68
closepath fill          % draw I2
I4 setcolor
14 12 M 18 12 L 18 16 L 14 16 L                 68d
closepath fill          % draw I4
I5 setcolor
0 6 M 12 18 L 0 18 L                            68e
closepath fill          % draw I5
I6 setcolor
0 18 M 20 18 L 20 20 L 0 20 L                   68f
closepathfill           % draw I6
```

```
% deal with the CT data
4 4 M 14 4 L 14 8 L 4 8 L closepath
clip                    % create a window for the image
3 3 translate           % prepare to paint image          70
12 6 scale              % scale to imagesize on page
CTImageDict image
...raster image data (line-interleaved) taken from CT file
showpage
```

FIG. 7B

NATIVE SEPARATED POSTSCRIPT 72
FOR IMAGE + VECTOR DATA

% begin prolog
/M {moveto} bind def           74
/L {lineto} bind def
% end prolog

---

% begin stup encopassing all separations
/New Yaxis {
       % match LW & PS y-axix
       0 21 translate 1 -1 scale
       } bind def
/DeviceGray setcolorspace
/temp 72 string def
/CTImageDict 8 dict def
CTImageDict begin      % standard image dict
    /Image Type       1 def    76
    /Width            12 def
    /Height          6 def
    /BitsPerComponent  8 def
    /ImageMatrix     [12 0 0 6 0 0] def
    /MultipleDatasources  false def
    /DataSource      {currentfile temp readhexstring pop} def
    /Decode         [0 1] def
end
% end setup encopassing all separations

---

% begin setup of cyan separation
/l1 1 def              % cyan component of white
/l2 0 def              % cyan component of blue
/l4 1 def              % cyan component of red   78a
/l5 0 def              % cyan component of blue
/l6 1 def              % cyan component of red
NewYAxis
% end setup of cyan separation

FIG.8A

% begin script of cyan separation
11 setcolor
0 0 M 0 20 L 20 20 L 20 0 L closepath
fill                          % draw 11                    ← 78
12 setcolor
14 2 M 17 5 L 11 5 L
closepath fill                % draw 12
14 setcolor
14 12 M 18 12 L 18 16 L 14 16 L
closepath fill                % draw 14
15 setcolor
0 6 M 12 18 L 0 18 L          ← 78b
closepath fill                % draw 15
16 setcolor
0 18 M 20 18 L 20 20 L 0 20 L
closepath fill                % draw 16

% deal with CT data of cyan separation
4 4 M 14 4 L 14 8 L 4 8 L closepath
clip                          % create a window for the image
3 3 translate                 % prepare to paint image
12 6 scale                    % scale to image size on page
CTImageDict image
...raster image data for cyan separation taken from CT file
showpage                      % draw the cyan page          ← 78c
% end script of cyan separation % begin setup of magenta separation
/I1 1 def                     % magenta component of white
/I2 0 def                     % magenta component of blue
/I4 0 def                     % magenta component of red    ← 80
/I5 0 def                     % magenta component of blue
/I6 0 def                     % magenta component of red
NewYAxis
% end setup of magenta separation
% begin script of magenta separation ...identical to script of cyan page
...with raster imagedata for magenta separation taken from CT file % end script of magenta separation

FIG. 8B

```
% begin setup of yellow separation

/l1 1 def          % yellow component of white
/l2 1 def          % yellow component of blue
/l4 0 def          % yellow component of red          82
/l5 1 def          % yellow component of blue       ←
/l6 0 def          % yellow component of red
NewYAxis
% end setup of yellow separation
%begin script of yellow separation ...identical to script of cyan page
...with raster image data for yellow separation taken from CT file % end script of yellow separation
```

```
% begin setup of black separation
/l1 1 def          % black component of white
/l2 1 def          % black component of blue
/l4 1 def          % black component of red          84
/l5 1 def          % black component of blue       ←
/l6 1 def          % black component of red
NewYAxis
% end setup of black separation
% begin script of black separation ...identical to script of cyan page
...with raster image data for black separation taken from CT file % end script of black separation
```

FIG. 8c

LW TO COMPOSITE PSEUDO POSTSCRIPT

```
% begin prolog
/M {moveto } bind def              102
/L {lineto} bind def
/RL {rlineto} bind def
% define shifts for rectangles
/AdjustYForRect {0 -0.5 translate} def
/RestoreYForRect {0 0.5 translate} def
% end prolog
% begin setup
% define colors of elements used on page
/l1 {0 0 0 0} def    % white           104
/l2 {1 1 0 0} def    % blue
/l3 {0 1 1 0} def    % red
/l4 {0 1 1 0} def    % red
/l5 {1 1 0 0} def    % blue
/l6 {0 1 1 0} def    % red
1 setlinewidth
% match page y-axis & PS y-axis
0 20 translate
1 -1 scale
/DeviceCMYK setcolorspace           106
% end setup l1 setcolor
AdjustYForRect
0 0 M 0 20 L 20 20 L 20 0 L closepath
fill              % draw l1 colored background
RestoreYForRect l2 setcolor
l4 2 M 1 0 RL    % 1st run-length of l2
l3 3 M 3 0 RL    % 2nd run-length of l2
l4 4 M 3 0 RL    % 3rd run-length of l2
l4 5 M 4 0 RL    % 4th run-length of l2
stroke           % draw l2-colored path
```

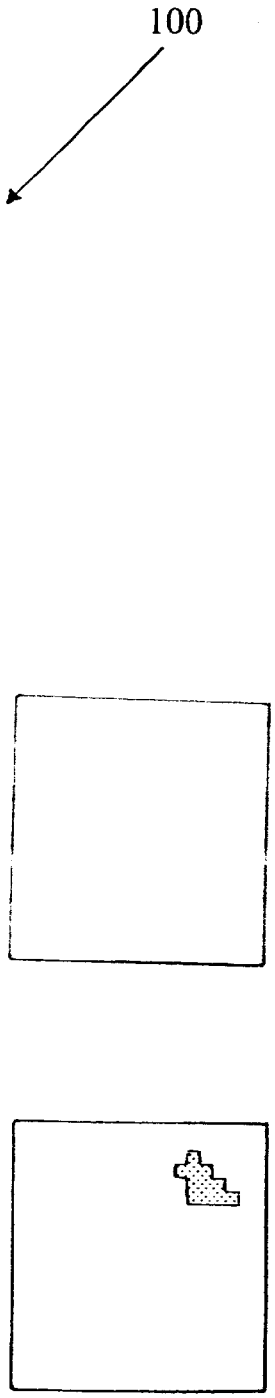

FIG. 9 A l3 setcolor
4 4 M 10 0 RL        % 1st run-length of l3
4 5 M 10 0 RL        % 2nd run-length of l3
4 6 M 10 0 RL        % 3rd run-length of l3
4 7 M 10 0 RL        % 4th run-length of l3
stroke               % draw l3-colored path

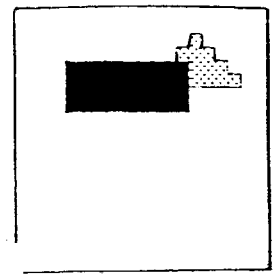

l4 setcolor
14 12 M 4 0 RL       % 1st run-length of l4
14 13 M 4 0 RL       % 2nd run-length of l4
14 14 M 4 0 RL       % 3rd run-length of l4
14 15 M 4 0 RL       % 4th run-length of l4
stroke               % draw l4-colored path

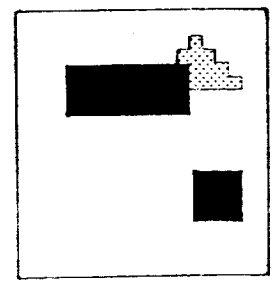

l5 setcolor
0 6 M 1 0 RL         % 1st run-length of l5
0 7 M 2 0 RL         % 2nd run-length of l5
0 8 M 3 0 RL         % 3rd run-length of l5
0 9 M 4 0 RL         % 4th run-length of l5
0 10 M 5 0 RL        % 5th run-length of l5
0 11 M 6 0 RL        % 6th run-length of l5
0 12 M 7 0 RL        % 7th run-length of l5
0 13 M 8 0 RL        % 8th run-length of l5
0 14 M 9 0 RL        % 9th run-length of l5
0 15 M 10 0 RL       % 10th run-length of l5
0 16 M 11 0 RL       % 11th run-length of l5
0 17 M 12 0 RL       % 12th run-length of l5
stroke               % draw l5-colored path

106 →

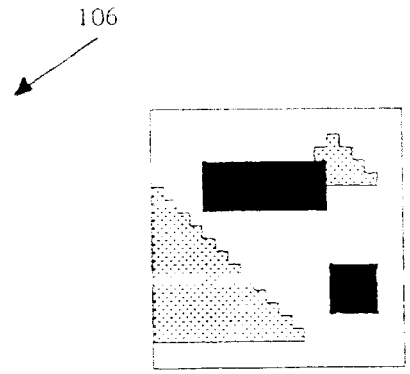

l6 setcolor
AdjustYForRect
0 18 M 20 18 L 20 20 L 0 20 L closepath
fill                 % draw l6-colored rectangle
RestoreYForRect showpage

FIG.9B

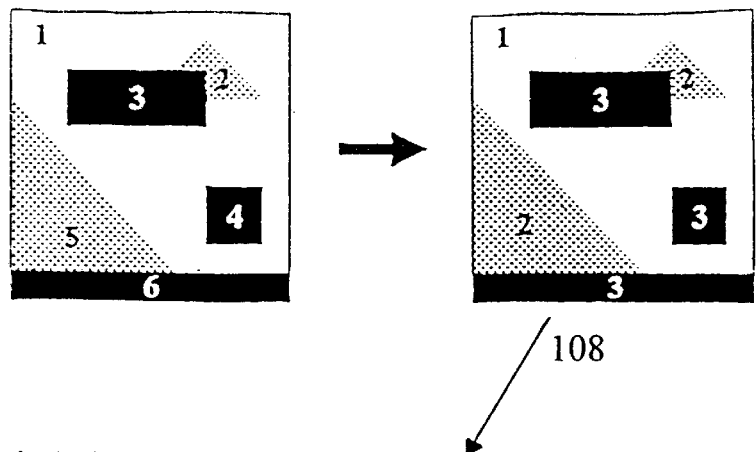

/108

Original table from Linework file

| Index | C value | M value | Y value | K value |
|---|---|---|---|---|
| 1 | 0 | 0 | 0 | 0 |
| 2 | 255 | 255 | 0 | 0 |
| 3 | 0 | 255 | 255 | 0 |
| 4 | 0 | 255 | 255 | 0 |
| 5 | 255 | 255 | 0 | 0 |
| 6 | 0 | 255 | 255 | 0 |

Internal Mapping table

| Old index | New index |
|---|---|
| 1 | 1 |
| 2 | 2 |
| 3 | 3 |
| 4 | 3 |
| 5 | 2 |
| 6 | 3 |

CODE FOR MAPPED INDICES VERSION:

% begin prolog
/M {moveto} bind def
/L {lineto} bind def
/RL {rlineto} bind def
% define shifts for rectangles
/AdjustYForRect {0 -0.5 translate} def
/RestoreYForRect {0 0.5 translate} def
% end prolog
% begin setup
% define colors of elements used on page
/I1 {0 0 0 0} def          % white
/I2 {1 1 0 0} def          % blue
/I3 {0 1 1 0} def          % red
% match page y-axis & PS y-axis
1 setlinewidth
0 20 translate
1 -1 scale
/DeviceCMYK setcolorspace
% end setup

FIG.10A 11 setcolor
AdjustYForRect
0 0 M 0 20 L 20 20 L 20 0 L closepath
fill          % draw rectangle 12 mapped to 11
RestoreYForRect

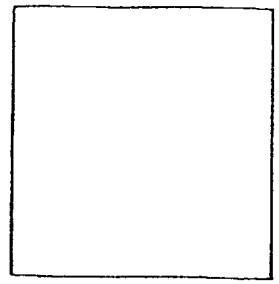

12 setcolor
% string together all Linework elements that are mapped to 12
% i.e. all elements having 12 or 15 as their color index
14 2 M 1 0 RL       % 1$^{st}$ run-length of triangle 14
13 3 M 3 0 RL       % 2$^{nd}$ run-length of triangle 14
14 4 M 3 0 RL       % 3$^{rd}$ run-length of triangle 14
14 5 M 4 0 RL       % 4$^{th}$ run-length of triangle 14
0 6 M 1 0 RL        % 1$^{st}$ run-length of triangle 20
0 7 M 2 0 RL        % 2$^{nd}$ run-length of triangle 20
0 8 M 3 0 RL        % 3$^{rd}$ run-length of triangle 20
0 9 M 4 0 RL        % 4$^{th}$ run-length of triangle 20
0 10 M 5 0 RL       % 5$^{th}$ run-length of triangle 20
0 11 M 6 0 RL       % 6$^{th}$ run-length of triangle 20
0 12 M 7 0 RL       % 7$^{th}$ run-length of triangle 20
0 13 M 8 0 RL       % 8$^{th}$ run-length of triangle 20
0 14 M 9 0 RL       % 9$^{th}$ run-length of triangle 20
0 15 M 10 0 R       % 10$^{th}$ run-length of triangle 20
0 16 M 11 0 R       % 11$^{th}$ run-length of triangle 20
0 17 M 12 0 R       % 12$^{th}$ run-length of triangle 20
stroke              % draw blue-colored path

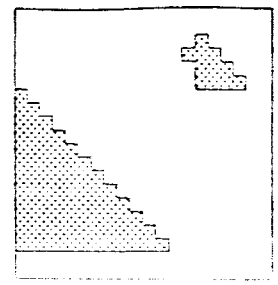

13 setcolor
4 4 M 10 0 RL       % 1$^{st}$ run-length of rectangle 16
4 5 M 10 0 RL       % 2$^{nd}$ run-length of rectangle 16
4 6 M 10 0 RL       % 3$^{rd}$ run-length of rectangle 16
4 7 M 10 0 RL       % 4$^{th}$ run-length of rectangle 16
14 12 M 4 0 RL      % 1$^{st}$ run-length of square 18
14 13 M 4 0 RL      % 2$^{nd}$ run-length of square 18
14 14 M 4 0 RL      % 3$^{rd}$ run-length of square 18
14 15 M 4 0 RL      % 4$^{th}$ run-length of square 18
stroke              % draw red-colored path

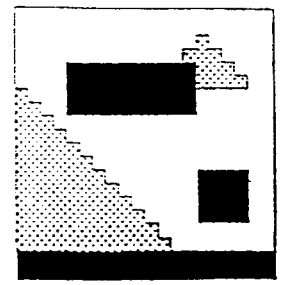

FIG.10 B

AdjustYForRect
0 18 M 20 18 L 20 20 L 020 L closepath
fill                % draw rectanle 22 mapped to 13
RestoreYForRect showpage

FIG. 10c

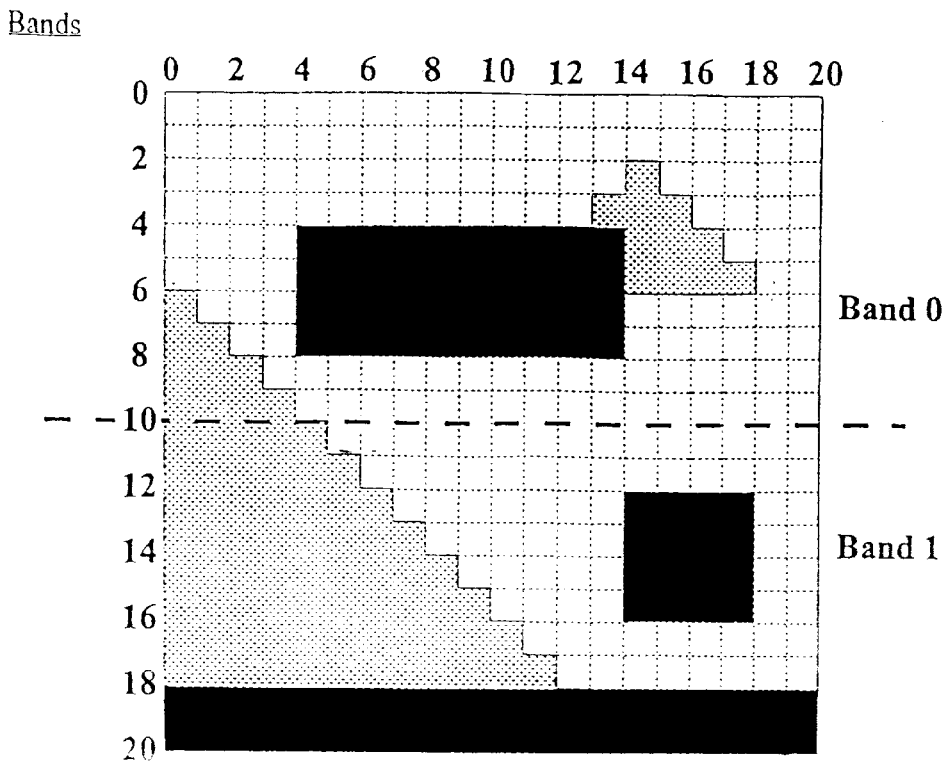

Bands

LW TO COMPOSITE PSEUDO PS WITH
BAND DIVISION

% begin prolog
/M {moveto} bind def
/L {lineto} bind def
/RL {rlineto} bind def
% define shifts for rectangles
/AdjustYForRect {0 -0.5 Translate} def
/RestoreYForRect {0 0.5 Translate} def
% end prolog
% begin setup
% define colors of elements used on page
/l1 {0 0 0 0} def    % white
/l2 {1 1 0 0} def    % blue
/l3 {0 1 1 0} def    % red
/l4 {0 1 1 0} def    % red
/l5 {1 1 0 0} def    % blue
/l6 {0 1 1 0} def    % red
1 setlinewidth

FIG.11A

% match page y-axis & PS y-axis
0 20 translate
1 -1 scale
/DeviceCMYK setcolorspace
% end setup % PostScript elements for Band 0
l1 setcolor
AdjustYForRect
0 0 M 0 10 L 20 10 L 20 0 L closepath
fill                    % draw l1 colored background
RestoreYForRect l2 setcolor
14 2 M 1 0 RL          % 1$^{st}$ run-length of l2
13 3 M 3 0 RL          % 2$^{nd}$ run-length of l2
14 4 M 3 0 RL          % 3$^{rd}$ run-length of l2
14 5 M 4 0 RL          % 4$^{th}$ run-length of l2
stroke                 % draw l2-colored path l3 setcolor
4 4 M 10 0 RL          % 1$^{st}$ run-length of l3
4 5 M 10 0 RL          % 2$^{nd}$ run-length of l3
4 6 M 10 0 RL          % 3$^{rd}$ run-length of l3
4 7 M 10 0 RL          % 4$^{th}$ run-length of l3
stroke                 % draw l3-colored path

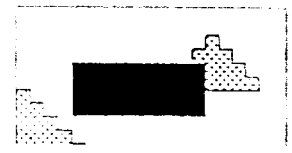

l5 setcolor
% includes only those elements of l5 appearing in band 0
0 6 M 1 0 RL          %1$^{st}$ run-length of l5
0 7 M 2 0 RL          % 2$^{nd}$ run-length of l5
0 8 M 3 0 RL          % 3$^{rd}$ run-length of l5
0 9 M 4 0 RL          % 4$^{th}$ run-length of l5
stroke                % draw l5-colored path %PostScript elements for Band 1
l1 setcolor
AdjustYForRect
0 10 M 0 20 L 20 20 L 20 10 L closepath
fill                   % draw l1 colored background
RestoreYFor Rect

FIG.11B l4 setcolor
l4 12 M 4 0 RL      % 1st run-length of l4
l4 13 M 4 0 RL      % 2nd run-length of l4
l4 14 M 4 0 RL      % 3rd run-length of l4
l4 15  M 4  RL      % 4th run-length of l4
stroke              % draw l4-colored path l5 setcolor
% includes only those elements of l5 appearing in band 1
0 10 M 5 0 RL       % 5th run-length of l5
0 11 M 6 0 RL       % 6th run-length of l5
0 12 M 7 0 RL       % 7th run-length of l5
0 13 M 8 0 RL       % 8th run-length of l5
0 14 M 9 0 RL       % 9th run-length of l5
0 15 M 10 0 RL      % 10th run-length of l5
0 16 M 11 0 RL      % 11th run-length of l5
0 17 M 12 0 RL      % 12th run-length of l5
stroke              % draw l5-colored path

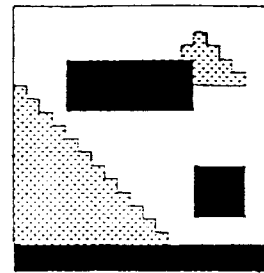

l6 setcolor
AdjustYForRect
0 18 M 20 18 L 20 20 L 0 20 L closepath
fill                % draw l6-colored rectangle
RestoreYForRect showpage

FIG.11c

Original LW
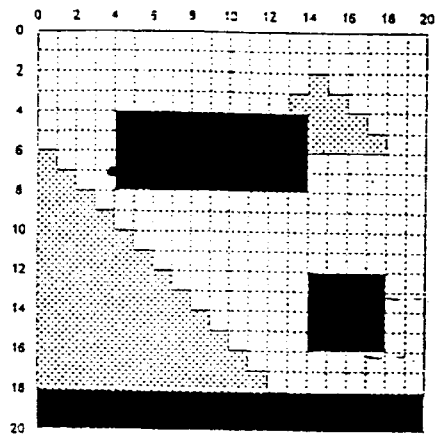
150
Scaled LW
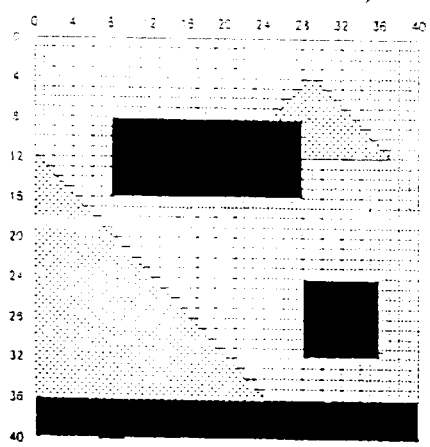
160
Final Device Bitmap
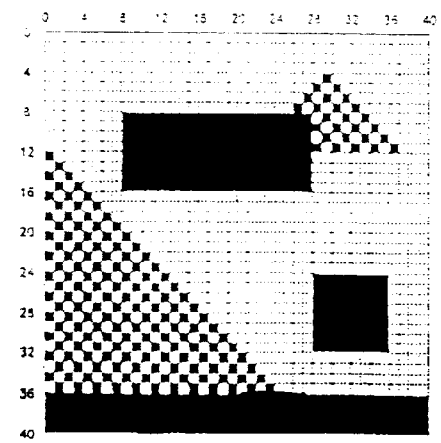
170
LW TO COMPOSITE PSEUDO-PS WITH RES X 2
% begin prolog
/M {moveto} bind def
/L {lineto} bind def
/RL {rlineto} bind def
% define shifts for rectangles
/AdjustYForRect {0 -0.5 translate} def
/RestoreYForRect {0 0.5translate} def
180
FIG.12A

```
% end prolog
% begin setup
% define colors of elements used on page
/l1 {0 0 0 0} def      % white
/l2 {1 1 0 0} def      % blue
/l3 {0 1 1 0} def      % red
/l4 {0 1 1 0} def      % red
/l5 {1 1 0 0} def      % blue
/l6 {0 1 1 0} def      % red
% match page y-axis & PS y-axis
0 40 translate
1 -1 scale
/DeviceCMYK setcolorspace
% end setup l1 setcolor
AdjustYForRect
0 0 M 0 40 L 40 40 L 40 0 L closepath
fill                   % draw l1 colored background
RestoreYForRect l2 setcolor
28 5 M 2 0 RL
27 6 M 4 0 RL
26 7 M 6 0 RL
25 8 M 8 0 RL
28 9 M 6 0 RL
28 10 M 7 0 RL
28 11 M 8 0 RL
28 12 M 9 0 RL
stroke                 % draw l2-colored path ... all other elements scaled in similar fashion showpage
```

FIG. 12B

LW TO SEPARATED PSEUDO PS /200

% begin prolog encompassing all separations
/M {moveto} bind def
/L {lineto} bind def
/RL {rlineto} bind def
% define shifts for rectangles
/AdjustYForRect {0 -0.5 translate} def ← 202
RestoreYForRect {0 0.5 translate} def
% end prolog encompassing all separations

---

% begin setup encompassing all separations
/NewYAxis {
    % match LW & PS y-axis
    0 20 translate 1 -1 scale ← 204
} bind def
/DeviceGray setcolorspace
1 setlinewidth
% end setup encompassing all separations

---

% begin setup of cyan separation
/l0 0 def   % full cyan component
/l255 1 def   % no cyan component
NwYAxis
% end setup of cyan separation

---

% begin script of cyan separation
l255 setcolor ← 206a
AdjustYForRect
0 0 M 0 20 L 20 20 L 20 0 L closepath
fill    % draw white background color
RestoreYForRect ← 206

--- l0 setcolor
14 2 M 1 0 RL   % 1$^{st}$ run-length of triangle 14
13 3 M 3 0 RL   % 2$^{nd}$ run-length of triangle 14
14 4 M 3 0 RL   % 3$^{rd}$ run-length of triangle 14
14 5 M 4 0 RL   % 4$^{th}$ run-length of triangle 14
0 6 M 1 0 RL   % 1$^{st}$ run-length of triangle 20 ← 206b
0 7 M 2 0 RL   % 2$^{nd}$ run-length of triangle 20

FIG.13A

| | |
|---|---|
| 0 8 M 3 0 RL | % 3$^{rd}$ run-length of triangle 20 |
| 0 9 M 4 0 RL | % 4$^{th}$ run-length of triangle 20 |
| 0 10 M 5 0 RL | % 5$^{th}$ run-length of triangle 20 |
| 0 11 M 6 0 RL | % 6$^{th}$ run-length of triangle 20 |
| 0 12 M 7 0 RL | % 7$^{th}$ run-length of triangle 20 |
| 0 13 M 8 0 RL | % 8$^{th}$ run-length of triangle 20 |
| 0 14 M 9 0 RL | % 9$^{th}$ run-length of triangle 20 |
| 0 15 M 10 0 RL | % 10$^{th}$ run-length of triangle 20 |
| 0 16 M 11 0 RL | % 11$^{th}$ run-length of triangle 20 |
| 0 17 M 12 0 RL | % 12$^{th}$ run-length of triangle 20 |
| stroke | % draw path with solid cyan |
| | |
| showpage | % draw the cyan page |
| % end script of cyan separation | |

---

% begin setup of magenta separation
/I0  0 def        % full magenta component
/I255 1 def       % no magenta component
NewYAxis
% end setup of magenta separation % begin script of magenta separation

---

I255 setcolor                              ← 208a
AdjustYForRect
0 0 M 0 20 L 20 20 L 20 0 L closepath
fill              % draw white background color
Restore YForRect

---

| | |
|---|---|
| I0 setcolor | |
| 14 2 M 1 0 RL | % 1$^{st}$ run-length of triangle 14 |
| 13 3 M 3 0 RL | % 2$^{nd}$ run-length of triangle 14 |
| 4 4 M 13 0 RL | % 1$^{st}$ run-length of rectangle 16 +3$^{rd}$ run-length of triangle 14 |
| 4 5 M 14 0 RL | % 2$^{nd}$ run-lengh of rectangle 16+ 4$^{th}$ run-length of triangle 14 |
| 4 6 M 10 0 RL | % 3$^{rd}$ run-length of rectangle 16 |
| 4 7 M 10 0 RL | % 4$^{th}$ run-length of rectangle 16 |
| 14 12 M 4 0 RL | % 1$^{st}$ run-length of square 18 |
| 14 13 M 4 0 RL | % 2$^{nd}$ run-length of square 18 |
| 14 14 M 4 0 RL | % 3$^{rd}$ run-length of square 18 |
| 14 15 M 4 0 RL | % 4$^{th}$ run-length of square 18 |

FIG.13 B

```
0 6 M 1 0 RL       % 1st run-length of triangle 20
0 7 M 2 0 RL       % 2nd run-length of triangle 20
0 8 M 3 0 RL       % 3rd run-length of triangle 20
0 9 M 4 0 RL       % 4th run-length of triangle 20
0 10 M 5 0 RL      % 5th run-length of triangle 20
0 11 M 6 0 RL      % 6th run-length of triangle 20
0 12 M 7 0 RL      % 7th run-length of triangle 20
0 13 M 8 0 RL      % 8th run-length of triangle 20
0 14 M 9 0 RL      % 9th run-length of triangle 20
0 15 M10 0 RL      % 10th run-length of triangle 20      ← 208b
0 16 M 11 0 RL     % 11th run-length of triangle 20
0 17 M 12 0 RL     % 12th run-length of triangle 20
stroke             % draw path with solid magenta AdjustYForRect
0 18 M 20 18 L 20 20 L 0 20 L closepath
fill               % draw rectangle 22 with solid magenta
RestoreYForRect showpage           % draw the magenta page
% end script of magenta separation
```

---

```
% begin setup of yellow separation
/0 0 def           % full yellow component
/1255 1 def        % no yellow component
NewYAxis
% end setup of yellow separation
```

---

```
% begin script of yellow separation 1255 setcolor                                             ← 210a
AdjustYForRect
0 0 M 0 20 L 20 20 L 20 0 L closepath
fill               % draw white background color
RestoreYForRect                                           ← 210
```

---

```
l0 setcolor
4 4 M 10 0 RL      % 1st run-length of rectangle 16
4 5 M 10 0 RL      % 2nd run-length of rectangle 16
4 6 M 10 0 RL      % 3rd run-length of rectangle 16
4 7 M 10 0 RL      % 4th run-length of rectangle 16
```

FIG.13c

| | |
|---|---|
| 14 12 M 4 0 RL | % 1st run-length of square 18 |
| 14 13 m 4 0 RL | % 2nd run-length of square 18 |
| 14 14 M 4 0 RL | % 3rd run-length of square 18 |
| 14 15 M 4 0 RL | % 4th run-length of square 18 |
| stroke | % draw path with solid yellow |

AdjustYForRect
0 18 M 20 18 L 20 20 L 0 20 L closepath
fill           % draw rectangle 22 with solid yellow
restoreYForRect
showpage     % draw the yellow page
% end script of yellow separation

---

% begin setup of black separation
/I0 0 def       % full black component
/I255 1 def     % no black component
NewYAxis
% end setup of black separation

---

% begin script of black separation                 ← 212

I255 setcolor
AdjustYForRect
0 0 M 0 20 L 20 20 L 20 0 L closepath
fill           % draw white background color
RestoreYForRect                                           212a
showpage     % draw the black page % end script of black separation

FIG. 13D

CT + LW TO COMPOSITE PSEUDO PS

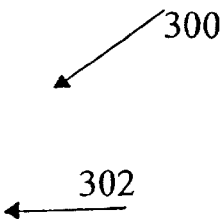

% begin prolog
/M {moveto} bind def
/L {lineto} bind def
/RL {rlineto} bind def
% define shifts for rectangles
/AdjustYForRect {0 -0.5 translate} def
/RestoreYFor Rect {0 0.5 translate} def
% end prolog

---

% begin setup
%define colors of elements used on page
/l1 {0 0 0 0} def          %white
/l2 {1 1 0 0} def          % blue
/l4 {0 1 1 0} def          % red
/l5 {1 1 0 0} def          % blue
/l6 {0 1 1 0} def          % red /temp1 12 string def
/temp2 12 string def
/temp3 12 string def
/temp4 12 string def
/CTImageDict 8 dict def
CTImageDict begin          % standard image dict
    /ImageType            1 def
    /Width                12 def
    /Height               6 def
    /BitsPerComponent 8 def
    /ImageMatrix          [12 0 6 0 0] def
    /MultipleDataSources  true def
    /DataSource           [{currentfile temp1 readhexstring pop}
                         {currentfile temp2 readhexstring pop}
                         {currentfile temp3 readhexstring pop}
                         {currentfile temp4 readhexstring pop}] def
    /Decode               [ 0 1 0 1 0 1 0 1]
end 1 setlinewidth
% match page y-axis & PS y-axis
0 20 translate

FIG.14 A

```
1 -1 scale
/DeviceCMYK setcolorspace
% end setup
```

---

```
% deal with the CT data
save
AdjustYForRect                                              ← 305
3 3 translate           % prepare to paint image
12 6 scale              % scale to image size on page
CTImageDict image
...raster image data (line-interleaved) taken from CT file
restore
```

---

```
% deal with the LW data
11 setcolor
AdjustYforRect
0 0 M 0 4 L 20 4 L 20 0 L closepath
fill                    % draw background rect above image
RestoreYForRect                                             ← 306

0 4 M 4 0 RL
14 4 M 6 0 RL
0 5 M 4 0 RL                                                ← 306a
14 5 M 6 0 RL
0 6 M 4 0 RL
14 6 M 6 0 RL
0 7 M 4 0 RL
14 7 M 6 0 RL
stroke                  % draw background on both sides of image AdjustYForRect
0 8 M 0 20 L 20 20 L 20 8 L closepath
fill                    % draw background rect below image
RestoreYForRect
```

---

```
l2 setcolor
14 2 M 1 0 RL          % 1st run-length of l2
13 3 M 3 0 RL          % 2nd run-length of l2                ← 306b
14 4 M 3 0 RL          % 3rd run-length of l2
14 5 M 4 0 RL          % 4th run-length of l2
stroke                 % draw l2-colored path
```

FIG. 14B

```
l4 setcolor
l4 12 M 4 0 RL        % 1st run-length of l4
l4 13 M 4 0 RL        % 2nd run-length of l4          ← 306d
l4 14 M 4 0 RL        % 3rd run-length of l4
l4 15 M 4 0 RL        % 4th run-length of l4
stroke                % draw l4-colored path
```

```
l5 setcolor                                          ← 306
0 6 M 1 0 RL          % 1st run-length of l5
0 7 M 2 0 RL          % 2nd run-length of l5
0 8 M 3 0 RL          % 3rd run-length of l5
0 9 M 4 0 RL          % 4th run-length of l5
0 10 M 5 0 RL         % 5th run-length of l5
0 11 M 6 0 RL         % 6th run-length of l5         ← 306e
0 12 M 7 0 RL         % 7th run-length of l5
0 13 M 8 0 RL         % 8th run-length of l5
0 14 M 9 0 RL         % 9th run-length of l5
0 15 M 10 0 RL        % 10th run-length of l5
0 16 M 11 0 RL        % 11th run-length of l5
0 17 M 12 0 RL        % 12th run-length of l5
stroke                % draw l5-colored path
```

```
l6 setcolor
AdjustYForRect
0 18 M 20 18 L 20 20 L 0 20 L closepath
fill                  % draw l6-colored rectangle    ← 306f
RestoreYforRect showpage
```

FIG.14c

CT + LW TO SEPARATED PSEUDO PS

400

% begin prolog encompassing all separations
/M {moveto} bind def
/L {lneto} bind def
/RL {rlineto} bind def
% define shifts for rectangles
/AdjustYForRect {0 -0.5 translate} def ← 402
/RestoreYForRect {0 0.5 translate} def
% end prolog encompassing all separations % begin setup encompassing all separations
/NewYAxis {
       % match LW & PS y-axis
       0 21 translate 1 -1 scale
      } bind def
/DeviceGray setcolorspace
/temp 72 string def
/CTImageDict 8dict def ← 404
    /ImageType         1 def
    /Width             12 def
    /Height           6 def
    /BitsPerComponent 8 def
    /ImageMatrix     [12 0 0 6 0 0] def
    /MultipleDataSources  false def
    /DataSource     {currentfile temp readhexstring pop} def
    /Decode          [0 1] def
end 1 setlinewidth
% end setup encompassing all separations % begin setup of cyan separation
/I0 0 def            % full cyan component
/I255 1 def         % no cyan component
NewYAxis
% end setup of cyan separation % begin script of cyan separation
% deal with CT data of cyan separation
save

FIG. 15A

AdjustYforRect             406a
3 3 translate   % prepare to paint image
12 6 scale    % scale to image size on page
CTImageDict image
... raster image data for cyan separation taken from CT file
restore               406

---

% deal with LW data of cyan separation
1255 setcolor
AdjustYforRect
0 0 M 0 4 L 20 4L 20 0 L closepath
fill      % draw background rect above image
RestoreYRor Rect 0 4 M 4 0 RL
14 4 M 6 0 RL
0 5 M 40 RL
14 5 M 6 0 RL           406b
0 6 M 4 0 RL
14 6 M 6 RL
0 7 M 4 0 RL
14 7 M 6 0 RL
stroke    % draw background on both sides of image AdjustYForRect
0 8 M 0 20 L 20 20 L 20 8 L closepath
fill      % draw background rect below image
RestoreYForRect 10 setcolor
14 2 M 1 0 RL  % 1$^{st}$ run-length of l2
13 3 M 3 0 RL  % 2$^{nd}$ run-length of l2
14 4 M 3 0 RL  % 3$^{rd}$ run-length of l2
14 5 M 4 0 RL  % 4$^{th}$ run-length of l2
0 6 M 1 0 RL   % 1$^{st}$ run-length of l5
0 7 M 2 0 RL   % 2$^{nd}$ run-length of l5
0 8 M 3 0 RL   % 3$^{rd}$ run-length of l5
0 9 M 4 0 RL   % 4$^{th}$ run-length of l5
0 10 M 5 0 RL   % 5$^{th}$ run-length of l5
0 11 M 6 0 RL   % 6$^{th}$ run-length of l5  406c
0 12 M 70 RL   % 7$^{th}$ run-length o l5
0 13 M 8 0 RL   % 8$^{th}$ run-length of l5

FIG. 15 B

| | |
|---|---|
| 0 14 M 9 0 RL | % 9th run-length of 15 |
| 0 15 M 10 0 RL | % 10th run-length of 15 |
| 0 16 M 11 0 RL | % 11th run-length of 15 |
| 0 17 M 12 0 RL | % 12th run-length of 15 |
| stroke | % draw path | showpage                % draw the cyan page
% end script of cyan separation

---

% begin setup of magenta separation
/l0 0 def               % full magenta component
/l255 1 def             % no magenta component
NewYAxis
% end setup of magenta separation

---

% begin script of magenta separation
% deal with CT data of magenta separation
save
AdjustYForRect 3 3 translate           % prepare to paint image          ← 408a
12 6 scale              % scale to image size on page
CTImageDict image
... raster image data for magenta separation taken from CT file
restore

---

% deal with LW data of magenta separation
l255 setcolor
AdjustForRect
0 0 M 0 4 L 20 4 L 20 0 L closepath
fill                    % draw background rect above image
restoreYForRect 0 4 M 4 0 RL
14 4 M 6 0 RL                                              ← 408
0 5 M 4 0 RL
14 5 M 6 0 RL
0 6 M 4 0 RL                                               ← 408b
14 6 M 6 0 RL
0 7 M 4 0 RL
14 7 M 6 0 RL
stroke                  % draw background on both sides of image

FIG. 15 c

```
14 7 M 6 0 RL
stroke                    % draw background on both sides of image
AdjustYForRect
0 8 M 0 20 L 20 20 L 20 8 L closepath
fill                      % draw background rect below image
RestoreYForRect
```

---

```
10 setcolor
14 2 M 1 0 RL             % 1st run-length of 12
13 3 M 3 0 RL             % 2nd run-length of 12
14 4 M 3 0 RL             % 3rd run-length of 12
14 5 M 4 0 RL             % 4th run-length of 12
14 12 M 4 0 RL            % 1st run-length of 14
14 13 M 4 0 RL            % 2nd run-length of 14
14 14 M 4 0 RL            % 3rd run-length of 14
14 15 M 4 0 RL            % 4th run-length of 14
0 6 M 1 0 RL              % 1st run-length of 15
0 7 M 2 0 RL              % 2nd run-length of 15          ← 408c
0 8 M 3 0 RL              % 3rd run-length of 15
0 9 M 4 0 RL              % 4th run-length of 15
0 10 M 5 0 RL             % 5th run-length of 15
0 11 M 6 0 RL             % 6th run-length of 15
0 12 M 7 0 RL             % 7th run-length of 15
0 13 M 8 0 RL             % 8th run-length of 15
0 14 M 9 0 RL             % 9th run-length of 15
0 15 M 10 0 RL            % 10th run-length of 15
0 16 M 11 0 RL            % 11th run-length of 15
0 17 M 12 0 RL            % 12th run-length of 15
stroke                    % draw path
```

```
AdjustYForRect
0 18 M 20 18 L 20 20 L 0 20 L closepath
fill                      % draw rectangle
RestoreYForRect showpage                  %draw the magenta page'
% end script of magenta seperation
```

---

```
% begin setup of yellow separation
/10 0 def                 % full yellow component
/1255 1 def               % no yellow component
NewYAxis
% end setup of yellow separation
```

FIG.15D

% begin script of yellow separation
% deal with CT data of yellow separation
save
AdjustYForRect
3 3 translate                  % prepare to paint image
12 6 scale                     % scale to image size on page          ← 410a
CTImagedict image
...raster image data for yellow separation taken from CT file
restore

---

% deal with LW data of yellow separation
l255 setcolor                                                         ← 410
AdjustYForRect
0 0 M 0 4 L 20 4 L 20 ) L closepath
fill                           % draw background rect above image
RestoreYFor Rect 0 4 M 4 0 RL
14 4 M 6 0 RL
0 5 M 4 0 RL                                                          ← 410b
14 5 M 6 0 RL
0 6 M 4 0 RL
14 6 M 6 0 RL
0 7 M 4 0 RL
14 7 M 6 0 RL
stroke                         % draw background on both sides of image AdjustYForRect
0 8 M 0 20 L 20 20 L 20 8 L closepath
fill                           % draw bckground rect below image
RestoreYforRect

---

10 setcolor
14 12 M 4 0 RL                 % 1$^{st}$ run-length of l4
14 13 M 4 0 RL                 % 2$^{nd}$ run-length of l4
14 14 M 4 0 RL                 % 3$^{rd}$ run-length of l4
14 15M 4 0 RL                  % 4$^{th}$ run-length of l4
stroke                         % draw path
                                                                      ← 410c
AdjustYForRect
0 l8 M 20 18 L 20 20 L 0 20 L closepath
fill                           % draw rectangle
RestoreYForRect

FIG.15E showpage                    % draw the yellow page
% end script of yellow separation

---

% begin setup of black separation
/I0 0 def                   % full black component
/I255 1 def                 % no black component
NewYAxis
%.end setup of black separation %begin script of black separation
% deal with CT data of black separation
save
AdjustYForRect
3 3 translate               % prepare to paint image
12 6 scale                  % scale to image size on page     ← 412a
CTImage Dict image
... raster image data for black separation taken from CT file
restore

---

% deal with LW data of black separation 1255 setcolor
AdjustYforRect
0 0 M 0 4 L 20 4 L 20 0 L closepath
fill                        % draw background rect above image
RestoreYForRect 0 4 M 4 0 RL
14 4 M 6 0 RL
0 5 M 4 0 RL
14 5 M 6 0 RL               ← 412b
0 6 M 4 0 RL
14 6 M 6 0 RL
0 7 M 4 0 RL
14 7 M 6 0 RL
stroke                      % draw background on both sides of image
AdjustYForRect
0 8 M 0 20 L 20 20 L 20 8 L closepath
fill                        % draw background rect below image
RestoreYForRect showpage
% end script of black separation

FIG. 15F

METHOD FOR CONVERSION OF A COLOR ELECTRONIC PRE-PRESS SYSTEM DATA FILE TO A PAGE DESCRIPTION LANGUAGE DATA FILE

FIELD AND BACKGROUND OF THE INVENTION

The present invention relates to image processing systems in general and in particular to a method for conversion of a Color Electronic Pre-press System (CEPS) image data file to a Page Description Language (PDL) file.

It is well known that an image data file prepared on a Color Electronic Pre-press System (CEPS) cannot be exposed on a PostScript-only output device. Generally speaking, the incompatibility between CEPS image data files and PostScript-only output devices derives from the format in which LineWork entries are stored in CEPS image data files as opposed to Continuous Tone image formats which are generally compatible with PostScript-only output devices.

Several approaches have been suggested to convert LineWork files of CEPS run length encoded (RLE) raster formats into PostScript files. One such approach includes the recognition of characters and graphic elements from the CEPS run length encoded (RLE) raster data and their subsequent conversion to equivalent PostScript vector representations. However, this approach suffers from several limitations including that it can handle LW data only and the LW-CT interface is not addressed, it produces complex LW files of linear vectors which typically take a long time to convert and to RIP, it does not produce separated PS files directly, it does not handle HCT data at all, and others. Another approach includes the conversion of a LineWork file and a Continuous Tone file into a single RLE image file which can be handled by a PS Level 2 RIP. However, this approach typically leads to unacceptably long processing times due to data explosion because of the high resolution of raster scanning, typically, in the order of 100 lines per mm.

There is therefore a need for a method for conversion of a Color Electronic Pre-press System (CEPS) image data file to a vector dominated Page Description Language (PDL) file.

SUMMARY OF THE INVENTION

The present invention is for a method for the conversion of a Color Electronic Pre-press System (CEPS) image data file to a vector dominated Page Description Language (PDL) file.

Hence, there is provided according to a first aspect of the present invention, a method of converting an CEPS LineWork image data file to a composite Page Description Language (PDL) file, the CEPS LineWork image data file including a LineWork image made up of a multiplicity of LineWork run length encoded (RLE) entries, the method comprising the steps of: (a) importing a portion of the LineWork image data file into the memory; (b) reading parameters from the portion of the LineWork image data file associated with the dimensions and resolution of the LineWork image; (c) preparing the composite PDL file according to the parameters from step (b); (d) reading a plurality of LineWork RLE entries from the CLPS LineWork image data file; (e) sorting the plurality of Linework RLE entries by color into clusters of Linework RLE entries; (f) translating each cluster of LineWork RLE entries into at least one PDL element; and (g) exporting each PDL element to the composite PDL file.

According to a further feature of the present invention, the PDL element is realized as a concatenation of horizontal line segments.

According to a still further feature of the present invention, the PDL element is realized as a rectangle.

According to a yet still further feature of the present invention, the clusters are sorted such that the cluster of the color having the greatest number of RLE entries is applied as a background color.

According to a yet still further feature of the present invention, the plurality of LineWork RLE entries is read from all the CEPS LineWork image data file.

According to a yet still further feature of the present invention, the CEPS LineWork image data file includes a LineWork color mapping table, the LineWork color mapping table having a multiplicity of color indices, the method further comprising the step of preparing an internal color mapping table from the LineWork color mapping table in which colors sharing the same CMYK values in the LineWork color mapping table are given the same color index in the internal color mapping table such that the step of sorting is by color index of the internal color mapping table.

According to a yet still further feature of the present invention, the method further comprising the step of defining the number of LineWork lines in a band and repeating steps (d) to (g) for each band such that all the LineWork image data file is read.

According to a yet still further feature of the present invention, the method further comprising the step of matching the resolution of the LineWork image data file with the resolution of an output device on which the composite PDL file is to be exposed.

According to a yet still further feature of the present invention, the method further comprising the step of matching the user space of the composite PDL file with the device space of the output device.

There is also provided according to a second aspect of the present invention, a method of converting an CEPS LineWork image data file to a separated Page Description Language (PDL) file, the separated PDL file including a page for each CMYK separation, the CEPS LineWork image data file including a LineWork image made up of a multiplicity of LineWork RLE entries, the method comprising the steps of: (a) importing a portion of the LineWork image data file into the memory; (b) reading parameters from the portion of the LineWork image data file associated with the dimensions and resolution of the LineWork image; (c) preparing the separated PDL file according to the parameters from step (b); (d) reading a plurality of LineWork RLE entries from the CEPS LineWork image data file; (e) preparing at least one cluster of LineWork RLE entries for each CMYK component separately, each of the at least one cluster being dedicated to a particular value for that CMYK separation color; (f) translating each cluster of Linework RLE entries into at least one PDL clement; and (g) exporting each PDL element to its corresponding CMYK script section of the separated PDL file.

According to a further feature of the present invention, the PDL element is realized as a concatenation of horizontal line segments.

According to a still further feature of the present invention, the PDL element is realized as a rectangle.

According to a yet still further feature of the present invention, the plurality of LineWork RLE entries is read from all the CEPS LineWork image data file.

According to a yet still further feature of the present invention, the method further comprising the step of defining the number of LineWork lines in a band and repeating steps (d) to (g) for each band such that all the LineWork image data file is read.

According to a yet still further feature of the present invention, the method further comprising the step of matching the resolution of the CEPS LineWork image data file with the resolution of an output device on which the separated PDL file is to be exposed.

According to a yet still further feature of the present invention, the method further comprising the step of matching the user space of the separated PDL file with the device space of the output device.

According to a yet still further feature of the present invention the at least one cluster are sorted for each CMYK component such that the cluster of the value of the CMYK separation color having the greatest number of RLE entries is applied as a background color.

There is also provided according to a third aspect of the present invention, a method of converting an CEPS page described by a LineWork image data file and a Continuous Tone image data file to a composite Page Description Language (PDL) file, the LineWork image data file including a LineWork image made up of multiplicity of LineWork run length encoded (RLE) entries of which at one entry has a transpcolor value assocwith a Continuous Tone image, the method comprising the steps of: (a) importing a portion of the Continuous Tone image data file into a memory; (b) reading parameters from the portion of the Continuous Tone image data file associated with the position, dimensions and resolution of the Continuous Tone image; (c) importing a portion of the LineWork image data file into the memory; (d) reading parameters from the portion of the LineWork image data file associated with the dimensions and resolution of the LineWork image; (e) preparing the composite PDL file according to the parameters from steps (b) and (d); (f) transferring Continuous Tone image data from the Continuous Tone image data file to the composite PDL file; (g) reading a plurality of LineWork RLE entries from the LineWork image data file; (h) sorting the plurality of Linework RLE entries by color into clusters of Linework RLE entries; (i) translating each cluster of LineWork RLE entries into at least one PDL element except for the clusters having transparent color values; and (j) exporting each PDL element to the composite PDL file.

According to a further feature of the present invention, the PDL element is realized as a concatenation of horizontal line segments.

According to a still further feature of the present invention, the PDL element is realized as a rectangle.

According to a yet still further feature of the present invention, the clusters are sorted such that the cluster of the color having the greatest number of RLE entries is applied as a background color in all areas except for transparent areas.

According to a yet still further feature of the present invention, the plurality of LineWork RLE entries is read from all the LineWork image data file.

According to a yet still further feature of the present invention, the LineWork image data file includes a LineWork color mapping table, the LineWork color mapping table having a multiplicity of color indices, the method further comprising the step of preparing an internal color mapping table from the LineWork color mapping table in which opaque colors sharing the same CMYK values in the Linework color mapping table are given the same color index in the internal color mapping table such that the step of sorting is by color index of the internal color mapping table.

According to a yet still further feature of the present invention, the method further comprising the step of defining the number of LineWork lines in a band and repeating steps (g) to (j) for each band such that all the LineWork image data file is read.

According to a yet still further feature of the present invention, the method further comprising the step of matching the resolution of the LineWork image data file with the resolution of an output device on which the composite PDL file is to be exposed.

According to a yet still further feature of the present invention, the method further comprising the step of matching the user space of the composite PDL file with the device space of the output device.

There is also provided according to a fourth aspect of the present invention, a method of converting an CEPS page described by a LineWork image data file and a Continuous Tone image data file to a separated Page Description Language (PDL) file, the LineWork image data file including a LineWork image made up of multiplicity of LineWork RLE entries of which at least one entry has a transparent color value associated with a Continuous Tone image, the method comprising the steps of: (a) importing a portion of the Continuous Tone image data file into a memory; (b) reading parameters from the portion of the Continuous Tone image data file associated with the position, dimensions and resolution of the Continuous Tone image; (c) importing a portion of the LineWork image data file into the memory; (d) reading parameters from the portion of the LineWork image data file associated with the dimensions and resolution of the LineWork image; (e) preparing the separated PDL file according to the parameters from steps (b) and (d); (f) transferring the Continuous Tone image data from the Continuous Tone image data file to the separated PDL file for the first of the CMYK components; (g) reading a plurality of LineWork RLE entries from the LineWork image data file; (h) preparing at least one cluster of LineWork RLE entries for the CMYK component selected in step (f), each of the at least one cluster being dedicated to a particular value for that CMYK separation color; (i) translating each cluster of LineWork RLE entries into at least one PDL element except for clusters having transparent color values in that separation; (j) exporting each PDL element to its corresponding CMYK script section of the separated PDL file; and (k) repeating steps (f) through (j) for the other CMYK components.

According to a further feature of the present invention, the PDL element is realized as a concatenation of horizontal line segments.

According to a still further feature of the present invention, the PDL element is realized as a rectangle.

According to a yet still further feature of the present invention, the plurality of LineWork RLE entries is read from all the LineWork image data file.

According to a yet still further feature of the present invention, the method further comprising the step of defining the number of LineWork lines in a band and repeating steps (g) to (j) for each band such that all the LineWork image data file is read.

According to a yet still further feature of the present invention, the method further comprising the step of matching the resolution of the LineWork image data file with the resolution of an output device on which the separated PDL file is to be exposed.

According to a yet still further feature of the present invention, the method further comprising the step of matching the user space of the composite PDL file with the device space of the output device.

According to a yet still further feature of the present invention, the at least one cluster are sorted for each CMYK component such that the cluster of the value of the CMYK separation color having the greatest number of RLE entries is applied as a background color in all areas except for the transparent areas.

BRIEF DESCRIPTION OF THE DRAWINGS

The invention is herein described, by way of example only, with reference to the accompanying drawings, wherein:

FIG. 2 illustrates an CEPS LineWork image data file with code describing the image of FIG. 1;

FIG. 3 illustrates a native composite PostScript file describing a page represented by the LineWork image of FIG. 1;

FIG. 4 illustrates a native separated PostScript file describing a page represented by the LineWork image of FIG. 1;

FIG. 5 illustrates a raster image including graphical elements and a Continuous Tone (CT) image;

FIG. 7 illustrates a native composite PostScript file describing a page represented by the image of FIG. 5;

FIG. 8 illustrates a native separated PostScript file describing a page represented by the image of FIG. 5;

FIG. 9 illustrates the output composite PostScript file describing the LineWork image of FIG. 1 after conversion from the input CEPS LineWork image data file illustrated in FIG. 2 according to the teachings of the present invention;

FIG. 10 illustrates a technique for color mapping and the subsequently modified output composite PostScript file;

FIG. 11 illustrates a technique for scanning the input CEPS image data file band-by-band and the subsequently modified output composite PostScript file;

FIG. 12 illustrates a technique for matching the resolution of the input CEPS image data file to the resolution of an output device and the subsequently modified output composite PostScript file;

FIG. 13 illustrates the output separated PostScript file describing the LineWork image of FIG. 1 after conversion from the input CEPS LineWork image data file illustrated in FIG. 2 according to the teachiof the present inv;

FIG. 14 illustrates the composite PostScript file describing the image of FIG. 5 after conversion from the input CEPS image data files (LW and CT) illustrated in FIG. 6 according to the teachings of the present invention; and FIG. 15 illustrates the output separated PostScript file describing the image of FIG. 5 after conversion from the input CEPS image data files (LW and CT) illustrated in FIG. 6 according to the teachings of the present invention.

DESCRIPTION OF THE PREFERRED EMBODIMENTS

The present invention is of a method for the conversion of a Color Electronic Pre-press System (CEPS) image data file to a vector dominated Page Description Language (PDL) file.

The principles and operation of the method according to the present invention may be better understood with reference to the drawings and the accompanying description.

Figure 1:
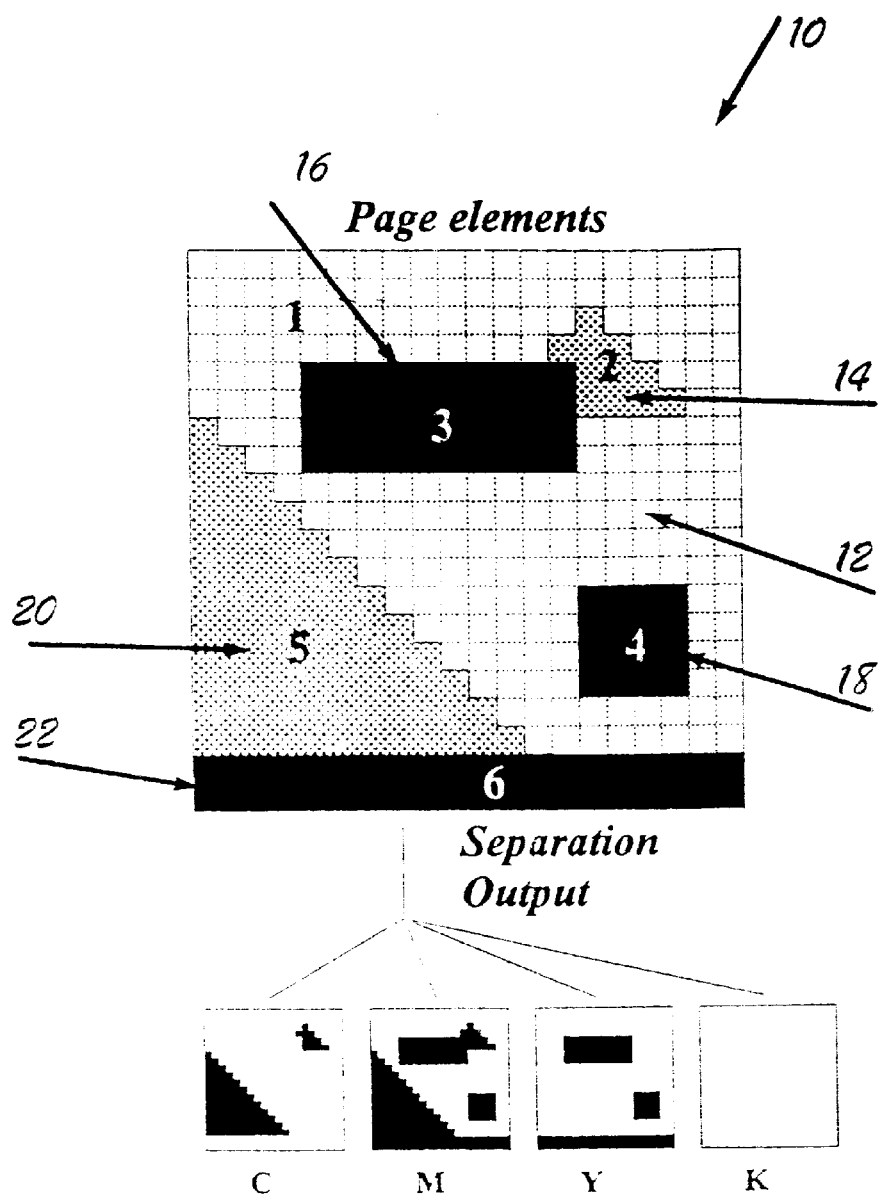
FIG. 1 illustrates a raster LineWork image including graphical elements.

For the sake of the better understanding of the principles and the operation of the present invention, the manner in which an CEPS image data file and a Page Description Language file represent the same image is now described with reference to an 20×20 image, generally designated 10, shown in FIG. 1. It should be noted that the term CEPS image file implies both image data files prepared on CEPS systems, such as Scitex systems, and also image data files prepared according to the TIFF/IT standard described in ANSI IT8.8. Furthermore, it should be noted that the term Page Description Language file implies both physical files and to a stream of Page Description Language code transmitted to a RIP, a computer, a workstation, and the like.

As can be clearly seen, image 10 includes only non-continuous tone LineWork elements including the following elements: a white background 12, a blue triangle 14, a red rectangle 16, a red square 18, a blue triangle 20 and a red rectangle 22. The resolution of elements 10–22 is typically between 2000–3000 dpi. Elements 10–22 are shaded according to a color scheme of color indices 1–6, respectively. In this case, color index 1 represents the color white, color indices 2 and 5 represent the color blue and color indices 3, 4 and 6 represent the color red. It should be noted that the practice of providing more than one color index for the same color facilitates better control during electronic page make-up as known in the art. As can be clearly seen, FIG. 1 also illustrates the CMYK separations of image 10.

With reference now to FIG. 2, a typical CEPS LineWork image data file 24 representing image 10 includes a LineWork color mapping table 26 detailing the CMYK values of the color indices 1–6 and a list 28 detailing each line of the 20 lines of image 10 in a top-to-bottom sequence using the top left hand corner of image 10 as the origin (0,0). In particular, LineWork color mapping table 26 illustrates that the CMYK values of the color indices 1–6 are as follows: (0,0,0,0) for white as represented by color index 1, (255, 255,0,0) for blue as represented by color indices 2 and 5 and (0,255,255,0) for red as represented by color indices 3, 4 and 6. It should be noted that CEPS LineWork data file 24 is illustrated in schematic form whereas in actual fact data files are binary encoded and are more complicated in the sense that they also include more parameters in the header, restrictions on the length of the runs, and the like. Each line of list 28 includes one or more run length encoded (RLE) entries. Each entry is in the format (a,b) where "a" represents the color index of the RLE entry and "b" represents the length of the RLE entry. Run Length Encoding is a well known method for raster data compression. Hence, Line 0 includes just a single RLE entry (1,20) indicative of the single white stroke extending across the width of image 10 while Line 4 includes four RLE entries (1,4)(3,10)(2,3)(1,3) indicative of a 4 pixel long white stroke, a 10 pixel long red stroke, a 3 pixel long blue stroke and a 2 pixel long white stroke. Hence, for the sake of clarity, triangle 14 is represented by four RLE entries on Lines 2, 3, 4 and 5. For more details of CEPS image data files, reference is made to the Scitex Handshake File Format Specification which is incorporated herein by reference as if fully set forth herein.

With reference now to FIGS. 3 and 4, native PostScript (PS) files 30 and 32 describe the page represented by image 10 according to a composite PostScript script format and a separated PostScript script format, respectively. It should be noted that the term native implies that PostScript files 30 and 32 are generated by an DTP application on an DTP system.

As is well known in the art, PostScript is a Page Description Language (PDL) developed by Adobe Systems Ltd. For more details of PostScript, reference is made to PostScript Language Reference Manual, 2nd Ed. ISBN 0-201-18127-4 which is incorporated herein by reference as if fully set forth herein.

The basic difference between native composite PostScript file 30 and native separated PostScript file 32 is that native composite PostScript file 30 represents image 10 element by element for the four CMYK separations together while native separated PostScript file 32 represents image 10 for each CMYK separation separately. For the sake of clarity, the difference between native composite PostScript file 30 and native separated PostScript file 32 can be better understood by the following brief notes.

Turning now to FIG. 3, native composite PostScript file 30 includes a prolog section 34, a set-up section 36 and a script section 38. Prolog section 34 includes general definitions (dictionaries). Set-up section 36 includes commands, parameters and definitions for that specific page. Examples, a command for instructing the use of the top left hand corner of an image as the origin (0,0) of the y axis rather than the conventional use of the bottom left hand corner of an image and the CMYK values of the color indices 1–6 in a similar fashion to LineWork color mapping table 26. In the file shown, the command maps the LineWork coordinate system onto the PostScript device coordinate system. Script section 38 typically includes two types of operators for representing the actual page elements: the first type of operators are vector operators, for example, moveto lineto, closepath, and the like which define a single line or a closed geometrical shape while the second type of operators are painting operators, for example, fill, stroke, and the like for applying color to either the line or the closed geometrical shape. Typically, the last operator of a PostScript page is the operator showpage.

Script section 38 includes six script sub-sections 38*a*, 38*b*, 38*c*, 38*d*, 38*e* and 38*f* for each of the color indices 1 to 6. Script sub-sections 38*a* to 38*f* are superimposed in their top-to-bottom sequence in native composite PostScript file 30 to establish the single montage of image 10. Hence, the top right hand section of rectangle 16, represented by the command lines:

---
I3 setcolor
4 4 M 14 4 L 14 8 L 4 8 L closepath
fill,

--- superimposes over the bottom left hand corner of triangle 14, represented by the command lines:

---
I2 setcolor
14 2 M 17 5 L 11 5 L closepath
fill

---

Turning now to FIG. 4, native separated PostScript file 32 includes a prolog section 40, a set-up section 42, a section 44 for the cyan separation, a section 46 for the magenta separation, a section 48 for the yellow separation and a section 50 for the black separation. Each of sections 44, 46, 48 and 50 includes a set-up section denoted "a" in which a value is given for each of the colors appearing in the page for each CMYK separation and a script section denoted "b" including vector representations for each of elements 12–22.

In other words, for the sake of clarity, section 44 for the cyan separation includes a set-up section 44*a* representing the cyan component percentage for each of color indices 1–6 and a script section 44*b* including the six vector representations for square 12, triangle 14, rectangle 16, square 18, triangle 20 and rectangle 22. Typically, the last operator in each of sections 44, 46, 4 and 50 is the showpage.

Thus, in native separPostScript file 32, rectangle 16 is represented by the command lines ---
I3 setcolor
4 4 M 14 4 L 14 8 L 4 8 L closepath
fill

--- in cyan script section 44*b*, magenta script section 46*b*, yellow script section 48*b* and black script section 50*b*. The difference being that the value of the red color is different for each of the CMYIK separations. In particular, for the color indices 3, 4 and 6, the value of the red color is 1,0,0,1 for set-up sections 44*a*, 46*a*, 48*a* and 50*a*, respectively. In a similar fashion, for the color indices 2 and 5, the value of the blue color is 0,0,1,1 for set-up sections 44*a*, 46*a*, 48*a* and 50*a*, respectively. As known in the art, the value of each CMYK separation can take any intermediate value between the solid value of 0 and the all white value of 1. It should be noted that color definitions in CMYK color space used in composite files have an inverse "polarity" to the GRAY color space used in separated files.

With reference now to FIGS. 5–8, to develop the example further, one of elements 12–22, in this case rectangle 16, is shown as an CT image 52 to form a new page, generally designated 54, in FIG. 5. CT image 52 is typically a scanned image and/or a vignette having a resolution of about 300 dpi. In certain cases, High resolution Continuous tone (HC) data is employed for the boundary between a LineWork element and an CT image, in this case, triangle 14 and CT image 52. Also, HC data is often employed for the boundary between two CT images. The manner in which CEPS LineWork image data file 24, native composite PostScript file 30 and native separated PostScript file 32 are modified to represent page 54 are described with reference to FIGS. 6, 7 and 8, respectively.

Figure 6:
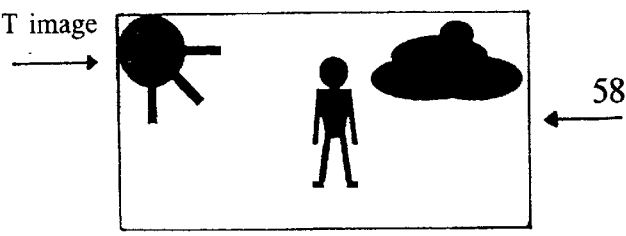
FIG. 6 illustrates an CEPS image data file with code describing the image of FIG. 5.

Turning now to FIG. 6, page 54 requires both an CEPS LineWork image data file 56 and an CEPS Continuous Tone image data file 58 of raster image data. As described with reference to CEPS LineWork data image file 24, CEPS LineWork data image file 56 includes a LineWork color mapping table 60 and a list 61 detailing each line of the 20 lines of page 54. The difference between LineWork color mapping table 60 and LineWork color mapping table 26 is that the red color identified by color index 3 is classed as a transparent color denoted T indicating that the pixels on Lines 4–7 painted this color should be left transparent to CT image 52 when exposed on an CEPS system. As is well known in the art, there are two types of transparent colors: full transparent colors in which an CT image is visible in all CMYK separations and semi-transparent colors in which an CT image is visible in some of the CMYK separations while it is superimposed by LineWork data in the remaining CMYK separations. In the present case, the red color identified by color index 3 is a full transparent color.

Turning now to FIG. 7, page 54 is described by a native composite PostScript file 62 including a prolog section 64, a set-up section 66, a script section 68 and a Continuous Tone image section 70 in the form of raster image data taken from CT file 58. The differences between native composite PostScript file 62 and native composite PostScript file 30 are as follows. First, set-up section 66 does not include the CMYK values of the color index 3. And second, script section 68 does not include a vector representation of rectangle 16 to be painted by the red color indicated as color index 3. Hence, script section 68 includes five sub-sections 68a, 68b, 68d, 68e and 68f for color indices 1, 2, 4, 5 and 6 and not six sub-sections as does composite PostScript file 32 by not including a sub-section 68c for color index 3. Rather, the vector representation of rectangle 16, namely "4 4 M 14 4 L 14 8 L 4 8 L closepath", is used in Continuous Tone image section 70 to define a clipping path which acts as the perimeter within which CT image 52 is placed.

Turning now to FIG. 8, page 54 is described by a native separated PostScript file 72 including a prolog section 74, a set-up section 76 and four sections 78, 80, 82 and 84 for the four CMYK separations. In this case, sections 78, 80, 82 and 84 include information regarding both elements 12–22 and CT image 52. The differences between, for example, cyan section 78 and cyan section 44 are as follows. First, cyan set-up section 78a does not include the cyan value of the color index 3. And second, cyan section 78 includes a cyan CT section 78c which includes the vector representation of rectangle 16, namely "4 4 M 14 4 L 14 8 L 4 8 L closepath", for defining a clipping path which acts as the perimeter within which the cyan data of CT image 52 is placed.

With reference now to FIG. 9, the method for conversion of an input CEPS image data file, for example, CEPS LineWork image data file 24, to an output composite PostScript file 100 according to the teachings of the present invention is now described with reference to image 10. Generally speaking, output composite PostScript file 100 has a similar format to native composite CEPS LineWork file 30 in that it includes a prolog section 102, a set-up section 104 and a script section 106. However, it should be noted that for the sake of clarity, the code shown in FIG. 9 and thereafter is the most elementary form embodying the principles of the present invention. In practice, the code will be more complicated in the sense that it will employ dictionaries, loops, binary encoding and other standard PostScript techniques and features.

Broadly speaking, the conversion is achieved by vectorizing the RLE entries in CEPS LineWork image data file 24 to PostScript elements by virtue of a novel use of PostScript operators. Although the method is described with particular reference to PostScript, it should be readily understood that the teachings of the present invention can be readily applied to a wide range of other commercially available vector dominated Page Description Languages including, but not limited to, Interpress, Adobe Acrobat Portable Document Format (PDF), and the like.

The first step of the conversion includes importing CEPS LineWork image data file 24 into a memory and extracting parameters from CEPS LineWork image data file 24 required for preparation of prolog section 102 and set-up section 104 of output composite PostScript file 100. Such parameters typically include page set-up details including, but not limited to, LW image height, LW image width, and LW image resolution. Preferably, the first step of conversion includes importing LineWork color mapping table 26, if available.

The second step of the conversion involves reading a plurality of LineWork RLE entries from CEPS LineWork image data file 24. The plurality of LineWork RLE entries can be read from all of file 24 or from part of file 24, known as a band of several lines, as described below in greater detail with reference to FIG. 11.

The third step of the conversion involves sorting the plurality of RLE entries by LineWork color into clusters of RLE entries such that each cluster includes all the RLE entries associated with one of the LineWork colors inherent to image 10. In the present instance, six clusters would be obtained for each of the colors 1 to 6. Hence, for example, the cluster associated with color 2 representative of triangle 14 includes the following RLE entries: Line 2(2,1), Line 3(2,3), Line 4(2,3) and Line 5(2,4). Furthermore, the clusters include information determining the x co-ordinates of the RLE entries. Alternatively, the sorting of RLE entries can be by color index if LineWork color mapping table 26 is available.

The fourth step of the conversion involves translating each cluster of RLE entries into one or more PostScript elements. Typically, the PostScript elements are either concatenations of horizontal line segments or rectangles. Concatenations of horizontal line segments, known as "paths" in PostScript, can include up to 1500 sub-paths i.e. 1500 line segments. Each sub-path is defined by a start point and an end point or, alternatively, by a start point and a vector length. The start points are defined in terof (,y) co-ordinates from (0,0). In the case of r, each rectangle is defined as a closed geometrical shape by four vectors in a similar fashion to the PostScript description of elements 12, 16 and 22 as described with reference to FIGS. 3 and 4. Alternatively, rectangles can be defined by any other standard rectangle representation in PostScript. The decision as to whether the RLE entries should be translated into a concatenation of horizontal line segments or rectangles depends on a number of factors including, the number of RLE entries in each cluster, whether an RLE entry extends across the LineWork page, and the presence of transparent colors for images. It should be noted that in some cases a technical correction is required when paths and rectangles appear on the same page. This correction is achieved by means of a small translation along the y axis when a rectangle is executed.

In the present instance, script section 106 of output composite PostScript file 100 indicates that the clusters of RLE entries associated with colors 2, 3, 4 and 5 are translated into paths including one or more sub-paths while the clusters of RLE entries associated with colors 1 and 6 are translated into rectangles. It should be noted that the cluster of RLE entries associated with color 1 is preferably translated into a rectangle covering the whole page and not a path so as to provide the background of image 10. The color, in this case white, is selected because its cluster of RLE entries has the greatest number of RLE entries. In other words, the color of the cluster having the greatest number of RLE entries is preferably defined as the background color in the output PostScript file.

The clusters of RLE entries associated with colors 2–5 are translated into paths including four sub-paths, four sub-paths, four sub-paths and twelve sub-paths, respectively. As mentioned hereinabove, each sub-path is defined by an operator determining the (x,y) start point of the sub-path and, in this case, an operator determining the length of the sub-path. Hence, for the sake of clarity, triangle 14 is translated into a path 14 2 M 1 0 RL, 13 3 M 3 0 RL, 14 4 M 3 0 RL and 14 5 M 4 0 RL in output composite PostScript file 100 in contrast to its vectorized geometrical representation in native composite PostScript file 30. The other elements in image 10, namely, rectangle 16, square 18 and triangle 20 are translated in a similar fashion as triangle 14.

The translation of rectangle 16 into a path and rectangle 22 into a rectangle is by virtue of rectangle 22 being recognized as a rectangle in image 10 because it extends across the width of the page of image 10 while rectangle 16 is not recognized as a rectangle in image 10. Hence, the representation of rectangle 22 in output composite PostScript file 100 is similar to its representation in native composite PostScript file 30.

The fifth and last step of the conversion is the exporting of the PDL elements to output composite PostScript file 100. As mentioned hereinabove, output composite PostScript file 100 can be a physical file or, alternatively, it can be a stream of Page Description Language code transmitted to a RIP, a computer, a workstation, and the like.

With reference now to FIGS. 10–12, the method described hereinabove can be refined by optimization algorithms to achieve a number of operational advantages, for example, a more compact PostScript file, a shorter conversion processing time, shorter RIPping time, better RIPping output quality and the like.

Turning now to FIG. 10, the conversion can include the generation of an internal color mapping table 108 in which color indices in LineWork color mapping table 26 which share common CMYK values are regarded as the same color in output composite PostScript file 100. Hence, in the present instance, the blue color represented by the color indices 2 and 5 are combined into a single color index 2 in internal color mapping table 108 while the red color represented by the color indices 3, 4 and 6 are combined into a single color index 3. All in all, for image 10, internal color mapping table 108 include three color indices: 1 for white, 2 for blue and 3 for red. As can be seen, output composite PostScript file 100 can be readily edited for three color indices 1, 2 and 3 instead of six color indices 1 to 6. In particular, it should be noted that the script section for color index 3 includes vectorial paths for representing rectangle 16 and square 18 and a vectorial rectangle for representing rectangle 22.

Turning now to FIG. 11, the conversion can include the step of scanning the lines of input CEPS image data file 24 in bands such that the steps of sorting the RLE entries by color into clusters of RLE entries and translating each cluster of RLE entries into one or more PDL elements are performed band-by-band. Typically, a band includes between about 200 and 1000 lines. In the present instance, image 10 is divided in two bands of 10 lines each. As can be seen, output composite PostScript file 100 can be readily edited for scanning band-by-band. It should be noted that the selection of one of the colors for use as the background color is also done on a band-by-band basis. In this case, the color white is the background color in both Band 0 and Band 1.

Turning now to FIG. 12, the conversion can include the step of matching the resolution of input CEPS LineWork image file 24 to the resolution of an intended PostScript output device. This matching is achieved by multiplying the resolution of input CEPS LineWork image data file 24 by the ratio of the resolution of intended PostScript output device to the resolution of input CEPS LineWork image data file. For the sake of example, the resolution of an intended PostScript output device 170 is shown to be twice the resolution of input CEPS LineWork image data file 24 (150). As can be seen in sample code 180, output composite PostScript file 100 can be readily edited to describe scaled LineWork image data file 160.

Furthermore, in this case, the conversion can include the step of matching the user space of output composite PostScript file 100 with the device space of the intended PostScript output device. As known in the art, user space refers to locations within the PostScript page while device space refers to locations within the final bitmap of the output device. Transformations between the user space and the device space normally include a scale factor from the user space units, normally $\frac{1}{72}$", to the device space units in pixels, a translation component from the user space origin to device space origin and possible rotation and reflection components. Mathematically, the transformation is carried out by a 3×3 matrix called the Current Transformation Matrix (CTM). In order to match the user space of the pseudo PS page to the Output device space, the LineWork pixels are adopted as the user space units and the scale factor is reduced to 1, thus mapping one LineWork pixel to exactly one device pixel. The other components of the transformation are kept intact.

With reference now to FIG. 13 the method for conversion of an input CEPS image data file, for example, CEPS LineWork image data file 24, to an output separated PostScript file 200 according to the teachings of the present invention is now described with reference to the present invention is now described with reference to image 10.

Generally speaking, output separated PostScript file 200 has a similar format to separated PostScript file 32 in that it includes a prolog section 202, a set-up section 204 and four sections 206, 208, 210 and 212 for each CMYK separation. However, in sharp contrast to native separated PostScript file 32, each of sections 206, 208, 210 and 212 typically includes a number of sub-sections dedicated to different gray levels of the CMYK separation ranging from white to solid color. The sub-section dedicated to the white value of the CMYK separation is typically represented as a square of background color.

The conversion is similar to the conversion from CEPS LineWork image data file 24 to output composite PostScript file 100. The difference beithathe sorting of Linework RLE entries into clusters by CMYK separation rather than by color (or color index) or, more accurately, by particular values of CMYK separations. Hence, the number of clusters for each CMYK separation corresponds to the number of values there are for each CMYK separation. In the example given hereinbelow, there are only two clusters for each CMYK separation because the values of the CMYK components are either 0 or 1. However, it should be noted that each cluster can be translated into one or more PostScript elements as will become clearer hereinbelow. Furthermore, it should be noted that the same optimization techniques which can be applied to output composite PostScript file 100 can be applied to output separated PostScript file 200 except for color mapping which is inherent to the separated mode.

Hence, in the present instance, cyan section 206 includes a sub-section 206*a* representing white on the cyan separation and a sub-section 206*b* representing solid color on the cyan representation. Sub-section 206*b* describes a path including sixteen sub-paths of which the first four sub-paths represent the cyan component of triangle 14 while the next twelve sub-paths represent the cyan component of triangle 20. While, magenta section 208 includes a sub-section 208*a* representing white on the magenta separation and a sub-section 208*b* representing solid color on the magenta representation. In this case, sub-section 208*b* includes a path having 22 sub-paths representing the magenta component of triangle 14, rectangle 16, square 18 and triangle 20 and a rectangle representing the magenta component of rectangle 22. It should be noted that the third and fourth sub-paths are concatenations of sub-paths originally from triangle 14 and rectangle 16. While, yellow section 210 includes a sub-section 210*a* representing white on the yellow separation and a sub-section 210*b* representing solid color on the yellow representation. In this case, sub-section 210*b* includes a path having 8 sub-paths for representing the yellow component of rectangle 16 and square 18 and a rectangle for representing the yellow component of rectangle 22. And while, black section 212 includes a sub-section 212a representing white on the black separation.

With reference now to FIG. 14, the method for conversion of an CEPS page to an output composite PostScript file 300 according to the teachings of the present invention is now described with reference to page 54. As mentioned hereinabove, page 54 is described by CEPS LineWork image data file 56 and Continuous Tone image data file 58. The conversion can be best treated in two parts. First, the conversion of Continuous Tone image data file 58 and second the conversion of LineWork image data file 56. In the case that page 54 is also described by HC image data, the HC image data is preferably converted into LineWork format such that it can be treated as LineWork image data.

The first step of the conversion includes importing a portion of Continuous Tone image data file 58 into a memory and extracting parameters from Continuous Tone image data file 58 required for preparation of prolog section 302 and set-up section 304 of output composite PostScript file 300. Such parameters typically include the position, dimensions and resolution of Continuous Tone image 58.

The second step of the conversion includes importing a portion of LineWork image data file 56 into the memory and extracting parameters required for preparation of prolog section 302 and set-up section 304 of PostScript file 300. Such parameters typically include page set-up details including, but not limited to, LW image height, LW image width, and the LW image resolution. Preferably, this step of the conversion includes importing LineWork color mapping table 60, if available.

The third step of the conversion includes preparing output composite PostScript file 300 and transferring the Continuous Tone image data from Continuous Tone image data file 58 to a Continuous Tone section 305 in output composite PostScript file 300.

The fourth step of the conversion is the conversion of LineWork image data file 56 which is performed in a similar manner to the conversion of LineWork image data file 24 as described with reference to output composite PostScript file 100. The difference being that the transparent color, in this case designated by color index 3, is not converted such that script section 306 includes five sub-sections 306a, 306b, 306d, 306e and 306f for color indices 1, 2, 4, 5 and 6 and does not includes a sub-section 306c for color index 3. However, rectangle 16 is used implicitly to prevent the optimization of applying a rectangle of background color to the whole page area because such a rectangle would superimpose some or all of the CT image. In this case, the background color is defined as two rectangles and a path covering the whole page except for the area defined as rectangle 16. As mentioned before, transparent colors can be semi-transparent which entails that a dedicated technique using the overprint concept defined in PostScript.

The fifth and last step of the conversion is the exporting of the PDL elements to output composite PostScript file 300. As mentioned hereinabove, output composite PostScript file 300 can be a physical file or, alternatively, it can be a stream of Page Description Language code transmitted to a RIP, a computer, a workstation, and the like.

With reference now to FIG. 15, the method for conversion of an CEPS page to an output separated PostScript file 400 according to the teachings of the present invention is now described with reference to page 54. As mentioned hereinabove, page 54 is described by CEPS LineWork image data file 56 and Continuous Tone image data file 58. Broadly speaking, the conversion can be regarded as a hybrid of the conversion of CEPS LineWork image data file 24 to output separated PostScript file 200 and the conversion of Continuous Tone image data file 58.

Hence, generally speaking, output separated PostScript file 400 has a similar format to output separated PostScript file 200 in that it includes a prolog section 402, a set-up section 404 and four sections 406, 408, 410 and 412 for each CMYK separation. However, in contrast to output separated PostScript file 200, each of sections 406, 408, 410 and 412 typically includes a sub-section denoted "a" dedicated to CT image 52. Furthermore, rectangle 16 is used as described hereinabove with reference to output composite PDL file 300.

Hence, in the present instance, cyan section 406 includes a sub-section 406a representing the cyan contribution in CT image 52 on the cyan separation, a sub-section 406b representing white on the cyan representation and a sub-section 406c representing solid color on the cyan representation. While, magenta section 408 includes a sub-section 408a representing the magenta contribution in CT image 52 on the magenta separation, a sub-section 408b representing white on the magenta separation and a sub-section 408c representing solid color on the magenta representation. While, yellow section 410 includes a sub-section 410a representing the yellow contribution in CT image 52 on the magenta separation, a sub-section 410b representing white on the magenta separation and a sub-section 410c representing solid color on the magenta separation. And while, black section 412 includes a sub-section 412a representing the black contribution in CT image 52 and a sub-section 412b representing white on the black separation.

While the invention has been described with respect to a limited number of embodiments, it will be appreciated that many variations, modifications and other applications of the invention may be made.

What is claimed is:

1. A method of converting a Color Electronic Pre-press System (CEPS) linework (LW) image data file to a composite Page Description Language (PDL) file, the CEPS linework image data file including a linework image made up of a multiplicity of linework run length encoded (RLE) entries, the linework image featuring dimensions and resolution, the method comprising the steps of:

(a) importing a portion of the linework image data file into a memory;

(b) reading parameters from the portion of the linework image data file associated with the dimensions and resolution of the linework image;

(c) preparing the composite PDL file according to the parameters from step (b);

(d) reading a plurality of linework RLE entries from the CEPS linework image data file;

(e) sorting the plurality of linework RLE entries by color into clusters of linework RLE entries;

(f) translating each cluster of linework RLE entries into at least one PDL element being realized as a rectangle if said cluster includes substantially a majority of RLE entries extending across a dimension of the linework image, and alternatively translating each cluster of linework RLE entries into at least one PDL element being realized as a concatenation of horizontal line segments; and (g) exporting each PDL element to the composite PDL file.

2. The method as in claim 1, wherein substantially the entirety of linework RLE entries is read from the CEPS linework image data file.

3. The method as in claim 1, wherein the CEPS linework image data file includes a linework color mapping table, the linework color mapping table having a multiplicity of color indices, the method further comprising the step of preparing an internal color mapping table from the linework color mapping table in which colors sharing the same Cyan, Magenta, Yellow, Black (CMYK) values in the linework color mapping table are given the same color index in the internal color mapping table such that the step of sorting is by color index of the internal color mapping table.

4. The method as in claim 1, further comprising the step of matching the resolution of the linework image data file with the resolution of an output device on which the composite PDL file is to be exposed.

5. The method as in claim 1, further comprising the step of matching the user space of the composite PDL file with the device space of the output device.

6. A method of converting a Color Electronic Pre-press System (CEPS) linework image data file to a separated Page Description Language (PDL) file, the separated PDL file including a page for each Cyan, Magenta, Yellow, Black (CMYK) separation color, the CEPS linework image data file including a linework image made up of a multiplicity of linework Run Length Encoded (RLE) entries, the method comprising the steps of:

(a) importing a portion of the linework image data file into a memory;

(b) reading parameters from the portion of the linework image data file associated with dimensions and resolution of the linework image;

(c) preparing the separated PDL file according to the parameters from step (b);

(d) reading a plurality of linework RLE entries from the CEPS linework image data file;

(e) preparing at least one cluster of linework RLE entries for each CMYK component separately, each of the at least one cluster being dedicated to a particular value for that CMYK separation color;

(f) translating each cluster of linework RLE entries into at least one first PDL element being realized as a rectangle if said cluster includes substantially majority of RLE entries extending across a dimension of the linework image, and alternatively into at least one second PDL element being realized as a concatenation of horizontal line segments;

(g) exporting each PDL element to its corresponding CMYK script section of the separated PDL file; and (h) repeating steps (d) to (g) for each CMYK separation color.

7. The method as in claim 6, wherein substantially the entirety of linework RLE entries is read from the CEPS linework image data file.

8. The method as in claim 6, wherein the CEPS linework image data file includes a linework color mapping table, the linework color mapping table having a multiplicity of color indices, the method further comprising the steps of preparing an internal color mapping table from the linework color mapping table in which colors sharing the same CMYK values in the linework color mapping table are given the same color index in the internal color mapping table, and sorting each cluster of linework RLE entries by color index of the internal color mapping table.

9. The method as in claim 6, further comprising the step of matching the resolution of the linework image data file with the resolution of an output device on which the separated PDL file is to be exposed.

10. The method as in claim 6, further comprising the step of matching the user space of the separated PDL file with the device space of the output device.

11. A method of converting a Color Electronic Pre-press System (CEPS) page described by a linework image data file and a Continuous Tone image data file to a composite Page Description Language (PDL) file, the linework image data file including a linework image made up of multiplicity of linework run length encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with position, dimensions and resolution of the Continuous Tone image;

(c) importing a portion of the linework image data file into the memory;

(d) reading parameters from the portion of the linework image data file associated with the dimensions and resolution of the linework image;

(e) preparing the composite PDL file according to the parameters from steps (b) and (d);

(f) transferring Continuous Tone image data from the Continuous Tone image data file to the composite PDL file;

(g) reading a plurality of linework RLE entries from the linework image data file;

(h) sorting the plurality of linework RLE entries by color into clusters of linework RLE entries;

(i) translating each cluster of linework RLE entries into at least one first PDL element being realized as a rectangle if said cluster includes substantially a majority of RLE entries extending across a dimension of the linework image, and alternatively into at least one second PDL element being realized as a concatenation of horizontal line segments, except for the clusters having transparent color values; and (j) exporting each PDL element to the composite PDL file.

12. The method as in claim 11, wherein substantially the entirety of linework RLE entries is read from the linework image data file.

13. The method as in claim 11, further comprising the step of matching the resolution of the linework image data file with the resolution of an output device on which the composite PDL file is to be exposed.

14. The method as in claim 11, further comprising the step of matching the user space of the composite PDL file with the device space of the output device.

15. The method as in claim 11, wherein the CEPS linework image data file includes a linework color mapping table, the linework color mapping table having a multiplicity of color indices, the method further comprising the step of preparing an internal color mapping table from the linework color mapping table in which colors sharing the same Cyan, Magenta, Yellow and Black (CMYK) values in the linework color mapping table are given the same color index in the internal color mapping table such that the step of sorting is by color index of the internal color mapping table.

16. A method of converting a Color Electronic Pre-press System (CEPS) page described by a linework image data file, a Continuous Tone (CT) image data file and a High resolution Continuous tone (HC) image data file to a composite Page Description Language (PDL) file, the linework image data file including a linework image made up of multiplicity of linework run length encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with dimensions and resolution of the Continuous Tone image;

(c) importing a portion of the linework image data file into the memory;

(d) reading parameters from the portion of the linework image data file associated with the dimensions and resolution of the linework image;

(e) importing a portion of the HC image data file into the memory;

(f) reading parameters from the portion of the HC image data file associated with the dimension and resolution of the HC image;

(g) preparing the composite PDL file according to the parameters from steps (b), (d) and (f);

(h) transferring Continuous Tone image data from the Continuous Tone image data file to the composite PDL file;

(i) reading a plurality of linework RLE entries from the linework image data file;

(j) sorting the plurality of linework RLE entries by color into clusters of linework RLE entries;

(k) translating each cluster of linework RLE entries into at least one PDL element except for the clusters having transparent color values;

(l) reading a plurality of HC entries from the HC image data file;

(m) converting said HC entries to linework RLE entries;

(n) repeating steps (j) and (k) for said RLE entries from step (m); and (o) exporting each PDL element to the composite PDL file.

17. The method as in claim 16, wherein substantially the entirety of linework RLE entries is read from the linework image data file.

18. The method as in claim 16, further comprising the step of matching the resolution of the linework image data file with the resolution of an output device on which the composite PDL file is to be exposed.

19. The method as in claim 16, further comprising the step of matching the user space of the PDL file with the device space of the output device.

20. The method as in claim 16, wherein the CEPS linework image data file includes a linework color mapping table, the linework color mapping table having a multiplicity of color indices, the method further comprising the step of preparing an internal color mapping table from the linework color mapping table in which colors sharing the same Cyan, Magenta, Yellow, Black (CMYK) values in the linework color mapping table are given the same color index in the internal color mapping table such that the step of sorting is by color index of the internal color mapping table.

21. A method of converting a Color Electronic Pre-press System (CEPS) page described by a linework image data file, a Continuous Tone (CT) image data file and a High resolution Continuous tone (H) image data file to a separated Page Description Language (PDL) file, the linework image data file including a linework image made up of multiplicity of linework run length encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with position, dimensions and resolution of the Continuous Tone image;

(c) importing a portion of the linework image data file into the memory;

(d) reading parameters from the portion of the linework image data file associated with the dimensions and resolution of the linework image;

(e) importing a portion of the HC image data file into the memory;

(f) reading parameters from the portion of the HC image data file associated with the dimension and resolution of the HC image;

(g) preparing the separated PDL file according to the parameters from steps (b), (d) and (f);

(h) transferring the Continuous Tone image data from the Continuous Tone image data file to the separated PDL file for a first of Cyan, Magenta, Yellow, Black (CMYK) components;

(i) reading a plurality of linework RLE entries from the linework image data file;

(j) preparing at least one cluster of linework RLE entries for the CMYK component selected in step (h), each of the at least one cluster being dedicated to a particular value for that CMYK separation color;

(k) translating each cluster of linework RLE entries into at least one PDL element except for clusters having transparent color values in that separation;

(l) reading a plurality of HC entries from the HC image data file;

(m) converting said HC entries to linework RLE entries;

(n) repeating steps (j) and (k) for said RLE entries from step (m);

(o) exporting each PDL element to its corresponding CMYK script section of the separated PDL file; and (p) repeating steps (h) through (n) for the other CMYK components.

22. The method as in claim 21, wherein substantially the entirety of linework RLE entries is read from all the linework image data file.

23. The method as in claim 21, further comprising the step of matching the resolution of the linework image data file with the resolution of an output device on which the separated PDL file is to be exposed.

24. The method as in claim 21, further comprising the step of matching the user space of the separated PDL file with the device space of the output device.

25. The method as in claim 21, wherein the CEPS linework image data file includes a linework color mapping table, the linework color mapping table having a multiplicity of color indices, the method further comprising the steps of preparing an internal color mapping table from the linework color mapping table in which colors sharing the same Cyan, Magenta, Yellow, Black (CMYK) values in the linework color mapping table are given the same color index in the internal color mapping table, and sorting each cluster of linework RLE entries by color index of the internal color mapping table.

26. A method of converting an Color Electronic Pre-press System (CEPS) linework (LW) image data file to a composite Page Description Language (PDL) file, the CEPS linework image data file including a linework image made up of a multiplicity of linework run length encoded (RLE) entries, the method comprising the steps of:

(a) importing a portion of the linework image data file into a memory;

(b) reading parameters from the portion of the linework image data file associated with the dimensions and resolution of the linework image;

(c) preparing the composite PDL file according to the parameters from step (b);

(d) reading a plurality of linework RLE entries from the CEPS linework image data file;

(e) sorting the plurality of linework RLE entries by color into clusters of linework RLE entries;

(f) translating each cluster of linework RLE entries into at least one PDL element, such that at least a portion of the linework image is converted to said at least one PDL element; and (g) exporting each PDL element to the composite PDL file.

27. The method as in claim 26, wherein substantially the entirety of linework RLE entries is read from all the CEPS linework image data file.

28. The method as in claim 26, wherein the CEPS linework image data file includes a linework color mapping table, the linework color mapping table having a multiplicity of color indices, the method further comprising the step of preparing an internal color mapping table from the linework color mapping table in which colors sharing the same Cyan, Magenta, Yellow, Black (CMYK) values in the linework color mapping table are given the same color index in the internal color mapping table such that the step of sorting is by color index of the internal color mapping table.

29. The method as in claim 26, further comprising the step of matching the resolution of the linework image data file with the resolution of an output device on which the composite PDL file is to be exposed.

30. The method as in claim 26, further comprising the step of matching the user space of the composite PDL file with the device space of the output device.

31. A method of converting a Color Electronic Pre-press System (CEPS) linework image data file to a separated Page Description Language (PDL) file, the separated PDL file including a page for each Cyan, Magenta, Yellow and Black (CMYK) separation color, the CEPS linework image data file including a linework image made up of a multiplicity of Run Length Encoded (RLE) entries, the method comprising the steps of:

(a) importing a portion of the linework image data file into a memory;

(b) reading parameters from the portion of the linework image data file associated with dimensions and resolution of the linework image;

(c) preparing the separated PDL file according to the parameters from step (b);

(d) reading a plurality of linework RLE entries from the CEPS linework image data file;

(e) preparing at least one cluster of linework RLE entries for each CMYK component separately, each of the at least one cluster being dedicated to a particular value for that CMYK separation color;

(f) translating each cluster of linework RLE entries into at least one PDL element, such that at least a portion of the linework image is converted to said at least one PDL element;

(g) exporting each PDL element to its corresponding CMYK script section of the separated PDL file; and (h) repeating steps (d) to (g) for each CMYK separation color.

32. The method as in claim 31, wherein substantially the entirety of linework RLE entries is read from all the CEPS linework image data file.

33. The method as in claim 31, further comprising the step of matching the resolution of the CEPS linework image data file with the resolution of an output device on which the separated PDL file is to be exposed.

34. The method as in claim 31, further comprising the step of matching the user space of the separated PDL file with the device space of the output device.

35. The method as in claim 31, wherein the CEPS linework image data file includes a linework color mapping table, the linework color mapping table having a multiplicity of color indices, the method further comprising the steps of preparing an internal color mapping table from the linework color mapping table in which colors sharing the same CMYK values in the linework color mapping table are given the same color index in the internal color mapping table, and sorting each cluster of linework RLE entries by color index of the internal color mapping table.

36. A method of converting a Color Electronic Pre-press System (CEPS) page described by a linework image data file and a Continuous Tone image data file to a composite Page Description Language (PDL) file, the linework image data file including a linework image made up of multiplicity of linework run length encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with position, dimensions and resolution of the Continuous Tone image;

(c) importing a portion of the linework image data file into said memory;

(d) reading parameters from the portion of the linework image data file associated with the dimensions and resolution of the linework image;

(e) preparing the composite PDL file according to the parameters from steps (b) and (d);

(f) transferring Continuous Tone image data from the Continuous Tone image data file to the composite PDL file;

(g) reading a plurality of linework RLE entries from the linework image data file;

(h) sorting the plurality of linework RLE entries by color into clusters of linework RLE entries;

(i) translating each cluster of linework RLE entries into at least one PDL element except for the clusters having transparent color values, such that at least a portion of the linework image is converted to said at least one PDL element; and (j) exporting each PDL element to the composite PDL file.

37. The method as in claim 36, wherein substantially the entirety of linework RLE entries is read from the linework image data file.

38. The method as in claim 36, wherein the linework image data file includes a linework color mapping table, the linework color mapping table having a multiplicity of color indices, the method further comprising the steps of preparing an internal color mapping table from the linework color mapping table in which opaque colors sharing the same Cyan, Magenta, Yellow and Black (CMYK) values in the linework color mapping table are given the same color index in the internal color mapping table, such that the step of sorting is by color index of the internal color mapping table.

39. The method as in claim 36, further comprising the step of matching the resolution of the linework image data file with the resolution of an output device on which the composite PDL file is to be exposed.

40. The method as in claim 36, further comprising the step of matching the user space of the composite PDL file with the device space of the output device.

41. A method of converting a Color Electronic Pre-press (CEPS) page described by a linework image data file and a Continuous Tone image data file to a separated Page Description Language (PDL) file, the linework image data file including a linework image made up of multiplicity of linework Run Length Encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with the position, dimensions and resolution of the Continuous Tone image;

(c) importing a portion of the linework image data file into the memory;

(d) reading parameters from the portion of the linework image data file associated with the dimensions and resolution of the linework image;

(e) preparing the separated PDL file according to the parameters from steps (b) and (d);

(f) transferring the Continuous Tone image data from the Continuous Tone image data file to the separated PDL file for the first of the Cyan, Magenta, Yellow and Black (CMYK) components;

(g) reading a plurality of linework RLE entries from the linework image data file;

(h) preparing at least one cluster of linework RLE entries for the CMYK component selected in step (f), each of the at least one cluster being dedicated to a particular value for that CMYK separation color;

(i) translating each cluster of linework RLE entries into at least one PDL element except for clusters having transparent color values in that separation, such that at least a portion of the linework image is converted to said at least one PDL element;

(j) exporting each PDL element to its corresponding CMYK script section of the separated PDL file; and (k) repeating steps (f) through (j) for the other CMYK components.

42. The method as in claim 41, wherein substantially the entirety of linework RLE entries is read from the linework image data file.

43. The method as in claim 41, further comprising the step of matching the resolution of the linework image data file with the resolution of an output device on which the separated PDL file is to be exposed.

44. The method as in claim 41, further comprising the step of matching the user space of the separated PDL file with the device space of the output device.

45. The method as in claim 41, wherein the CEPS linework image data file includes a linework color mapping table, the linework color mapping table having a multiplicity of color indices, the method further comprising the steps of preparing an internal color mapping table from the linework color mapping table in which colors sharing the same Cyan, Magenta, Yellow, Black (CMYK) values in the linework color mapping table are given the same color index in the internal color mapping table, and sorting each cluster of linework RLE entries by color index of the internal color mapping table.

46. A method of converting an Color Electronic Pre-press System (CEPS) linework (LW) image data file to a composite Page Description Language (PDL) file, the CEPS linework image data file including a linework image made up of a multiplicity of linework run length encoded (RLE) entries, the method comprising the steps of:

(a) importing a portion of the linework image file into a memory;

(b) reading parameters from the portion of the linework image data file associated with the dimensions and resolution of the linework image;

(c) preparing the composite PDL file according to the parameters from step (b), including defining at least one PDL element;

(d) reading a plurality of linework RLE entries from the CEPS linework image data file;

(e) sorting the plurality of linework RLE entries by color into clusters of linework RLE entries;

(f) translating each cluster of linework RLE entries into at least one PDL element; and (g) exporting each PDL element to the composite PDL file.

47. The method as in claim 46, wherein substantially the plurality of linework RLE entries is read from the CEPS linework image data file.

48. The method as in claim 46, wherein the CEPS linework image data file includes a linework color mapping table, the linework color mapping table having a multiplicity of color indices, the method further comprising the step of preparing an internal color mapping table from the linework color mapping table in which colors sharing the same Cyan, Magenta, Yellow, Black (CMYK) values in the linework color mapping table are given the same color index in the internal color mapping table such that the step of sorting is by color index of the internal color mapping table.

49. The method as in claim 46, further comprising the step of matching the resolution of the linework image data file with the resolution of an output device on which the composite PDL file is to be exposed.

50. The method as in claim 46, further comprising the step of matching the user space of the composite PDL file with the device space of the output device.

51. A method of converting a Color Electronic Pre-press System (CEPS) linework image data file to a separated Page Description Language (PDL) file, the separated PDL file including a page for each Cyan, Magenta, Yellow and Black (CMYK) separation color, the CEPS linework image data file in a linework image made up of a multiplicity of linework Run Length Encoded (RLE) entries, the method comprising the steps of:

(a) importing a portion of the linework image data file into a memory;

(b) reading parameters from the portion of the linework image data file associated with dimensions and resolution of the linework image;

(c) preparing the separated PDL file according to the parameters from step (b), including defining at least one PDL element;

(d) reading a plurality of linework RLE entries from the CEPS linework image data file;

(e) preparing at least one cluster of linework RLE entries for each CMYK component separately, each of the at least one cluster being dedicated to a particular value for that CMYK separation color;

(f) translating each cluster of linework RLE entries into at least one PDL element;

(g) exporting each PDL element to its corresponding CMYK script section of the separated PDL file; and (h) repeating steps (d) to (g) for each CMYK separation color.

52. The method as in claim 51, wherein substantially the entirety of linework RLE entries is read from the CEPS linework image data file.

53. The method as in claim 51, further comprising the step of matching the resolution of the CEPS linework image data file with the resolution of an output device on which the separated PDL file is to be exposed.

54. The method as in claim 51, further comprising the step of matching the user space of the separated PDL file with the device space of the output device.

55. The method as in claim 51, wherein the CEPS linework image data file includes a linework color mapping table, the linework color mapping table having a multiplicity of color indices, the method further comprising the steps of preparing an internal color mapping table from the linework color mapping table in which colors sharing the same Cyan, Magenta, Yellow, Black (CMYK) values in the linework color mapping table are given the same color index in the internal color mapping table, and sorting each cluster of linework RLE entries by color index of the internal color mapping table.

56. A method of converting a Color Electronic Pre-press System (CEPS) page described by a linework image data file and a Continuous Tone image data file to a composite Page Description Language (PDL) file, the linework image data file including a linework image made up of multiplicity of linework run length encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with position, dimensions and resolution of the Continuous Tone image;

(c) importing a portion of the linework image data file into the memory;

(d) reading parameters from the portion of the linework image data file associated with the dimensions and resolution of the linework image;

(e) preparing the composite PDL file according to the parameters from steps (b) and (d), including defining at least one PDL element;

(f) transferring Continuous Tone image data from the Continuous Tone image data file to the composite PDL file;

(g) reading a plurality of linework RLE entries from the linework image data file;

(h) sorting the plurality of linework RLE entries by color into clusters of linework RLE entries;

(i) translating each cluster of linework RLE entries into at least one PDL element except for the clusters having transparent color values; and (j) exporting each PDL element to the composite PDL file.

57. The method as in claim 56, wherein substantially the entirety of linework RLE entries is read from the linework image data file.

58. The method as in claim 56, wherein the linework image data file includes a linework color mapping table, the linework color mapping table having a multiplicity of color indices, the method further comprising the step of preparing an internal color mapping table from the linework color mapping table in which opaque colors sharing the same Cyan, Magenta, Yellow and Black (CMYK) values in the linework color mapping table are given the same color index in the internal color mapping table such that the step of sorting is by color index of the internal color mapping table.

59. The method as in claim 56, further comprising the step of matching the resolution of the linework image data file with the resolution of an output device on which the composite PDL file is to be exposed.

60. The method as in claim 56, further comprising the step of matching the user space of the composite PDL file with the device space of the output device.

61. A method of converting a Color Electronic Pre-press (CEPS) page described by a linework image data file and a Continuous Tone image data file to a separated Page Description Language (PDL) file, the linework image data file including a linework image made up of multiplicity of linework Run Length Encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with position, dimensions and resolution of the Continuous Tone image;

(c) importing a portion of the linework image data file into said memory;

(d) reading parameters from the portion of the linework image data file associated with the dimensions and resolution of the linework image;

(e) preparing the separated PDL file according to the parameters from steps (b) and (d), including defining at least one PDL element;

(f) transferring the Continuous Tone image data from the Continuous Tone image data file to the separated PDL file for the first of the Cyan, Magenta, Yellow and Black (CMYK) components;

(g) reading a plurality of linework RLE entries from the linework image data file;

(h) preparing at least one cluster of linework RLE entries for the CMYK component selected in step (f), each of the at least one cluster being dedicated to a particular value for that CMYK separation color;

(i) translating each cluster of linework RLE entries into at least one PDL element except for clusters having transparent color values in that separation;

(j) exporting each PDL element to its corresponding CMYK script section of the separated PDL file; and (k) repeating steps (f) through (j) for the other CMYK components.

62. The method as in claim 61, wherein substantially the entirety of linework RLE entries is read from the linework image data file.

63. The method as in claim 61, wherein the linework image data file includes a linework color mapping table, the linework color mapping table having a multiplicity of color indices, the method further comprising the steps of preparing an internal color mapping table from the linework color mapping table in which opaque colors sharing the same Cyan, Magenta, Yellow and Black (CMYK) values in the linework color mapping table are given the same color index in the internal color mapping table, and sorting each cluster of linework RLE entries by color index of the internal color mapping table.

64. The method as in claim 61, further comprising the step of matching the resolution of the linework image data file with the resolution of an output device on which the separated PDL file is to be exposed.

65. The method as in claim 61, further comprising the step of matching the user space of the separated PDL file with the device space of the output device.

66. A method of converting a Color Electronic Pre-press (CEPS) page described by a linework image data file and a Continuous Tone image data file to a separated Page Description Language (PDL) file, the linework image data file including a linework image made up of multiplicity of linework Run Length Encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with position, dimensions and resolution of the Continuous Tone image;

(c) importing a portion of the linework image data file into the memory;

(d) reading parameters from the portion of the linework image data file associated with the dimensions and resolution of the linework image;

(e) preparing the separated PDL file according to the parameters from steps (b) and (d);

(f) transferring the Continuous Tone image data from the Continuous Tone image data file to the separated PDL file for the first of the Cyan, Magenta, Yellow and Black (CMYK) components;

(g) reading a plurality of linework RLE entries from the linework image data file;

(h) preparing at least one cluster of linework RLE entries for the CMYK component selected in step (f), each of the at least one cluster being dedicated to a particular value for that CMYK separation color;

(i) translating each cluster of linework RLE entries into at least one PDL element being realized as a rectangle if said cluster includes substantially a majority of RLE entries extending across a dimension of the linework image, and alternatively being realized as a concatenation of horizontal line segments, except for clusters having transparent color values in that separation;

(j) exporting each PDL element to its corresponding CMYK script section of the separated PDL file; and (k) repeating steps (f) through (j) for the other CMYK components.

67. The method as in claim 66, wherein substantially the entirety of linework RLE entries is read from the linework image data file.

68. The method as in claim 66, further comprising the step of matching the resolution of the linework image data file with the resolution of an output device on which the separated PDL file is to be exposed.

69. The method as in claim 66, further comprising the step of matching the user space of the separated PDL file with the device space of the output device.

70. The method as in claim 66, wherein the CEPS linework image data file includes a linework color mapping table, the linework color mapping table having a multiplicity of color indices, the method further comprising the steps of preparing an internal color mapping table from the linework color mapping table in which colors sharing the same Cyan, Magenta, Yellow and Black (CMYK) values in the linework color mapping table are given the same color index in the internal color mapping table, and sorting each cluster of linework RLE entries by color index of the internal color mapping table.

71. A method of converting a Color Electronic Pre-press System (CEPS) page described by a linework image data file and a Continuous Tone image data file to a composite Page Description Language (PDL) file, the linework image data file including a linework image made up of multiplicity of linework run length encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with position, dimensions and resolution of the Continuous Tone image;

(c) importing a portion of the linework image data file into the memory;

(d) reading parameters from the portion of the linework image data file associated with the dimensions and resolution of the linework image;

(e) preparing the composite PDL file according to the parameters from steps (b) and (d);

(f) transferring Continuous Tone image data from the Continuous Tone image data file to the composite PDL file;

(g) reading a plurality of linework RLE entries from the linework image data file;

(h) sorting the plurality of linework RLE entries by color into clusters of linework RLE entries;

(i) translating each cluster of linework RLE entries into at least one first PDL element being realized as a concatenation of horizontal line segments if the color of said cluster substantially differs from the color of a neighboring cluster, and alternatively translating each cluster of linework/RLE entries into at least one second PDL element being realized as a rectangle if the color of said cluster is substantially similar to the color of a neighboring cluster;

(j) exporting each PDL element to the composite PDL file.

72. The method as in claim 71, wherein substantially the entirety of linework RLE entries is read from the linework image data file.

73. The method as in claim 71, wherein the linework image data file includes a linework color mapping table, the linework color mapping table having a multiplicity of color indices, the method further comprising the step of preparing an internal color mapping table from the linework color mapping table in which opaque colors sharing the same Cyan, Magenta, Yellow and Black (CMYK) values in the linework color mapping table are given the same color index in the internal color mapping table such that the step of sorting is by color index of the internal color mapping table.

74. The method as in claim 71, further comprising the step of matching the resolution of the linework image data file with the resolution of an output device on which the composite PDL file is to be exposed.

75. The method as in claim 71, further comprising the step of matching the user space of the composite PDL file with the device space of the output device.

76. A method of converting a Color Electronic Pre-press (CEPS) page described by a linework image data file and a Continuous Tone image data file to a separated Page Description Language (PDL) file, the linework image data file including a linework image made up of multiplicity of linework Run Length Encoded (RLE) entries of which at least one entry has a transparent color value associated with a Continuous Tone image, the method comprising the steps of:

(a) importing a portion of the Continuous Tone image data file into a memory;

(b) reading parameters from the portion of the Continuous Tone image data file associated with position, dimensions and resolution of the Continuous Tone image;

(c) importing a portion of the linework image data file into the memory;

(d) reading parameters from the portion of the linework image data file associated with the dimensions and resolution of the linework image;

(e) preparing the separated PDL file according to the parameters from steps (b) and (d);

(f) transferring the Continuous Tone image data from the Continuous Tone image data file to the separated PDL file for the first of the Cyan, Magenta, Yellow and Black (CMYK) components;

(g) reading a plurality of linework RLE entries from the image data file;

(h) preparing at least one cluster of linework RLE entries for the CMYK component selected in step (f), each of the at least one cluster being dedicated to a particular value for that CMYK separation color;

(i) translating each cluster of linework RLE entries into at least one first PDL element being realized as a concatenation of horizontal line segments if the color of said cluster substantially differs from the color of a neighboring cluster, and alternatively translating each cluster of linework RLE entries into at least one second PDL element being realized as a rectangle if the color of said cluster is substantially similar to the color of a neighboring cluster;

(j) exporting each PDL element to its corresponding CMYK script section of the separated PDL file; and (k) repeating steps (f) through (j) for the other CMYK components.

77. The method as in claim 76, wherein substantially the entirety of linework RLE entries is read from the linework image data file.

78. The method as in claim 76, wherein the linework image data file includes a linework color mapping table, the linework color mapping table having a multiplicity of color indices, the method further comprising the steps of preparing an internal color mapping table from the linework color mapping table in which opaque colors sharing the same Cyan, Magenta, Yellow and Black (CMYK) values in the linework color mapping table are given the same color index in the internal color mapping table, and sorting each cluster of linework RLE entries by color index of the internal color mapping table.

79. The method as in claim 76, further comprising the step of matching the resolution of the linework image data file with the resolution of an output device on which the separated PDL file is to be exposed.

80. The method as in claim 76, further comprising the step of matching the user space of the separated PDL file with the device space of the output device.

* * * * *

UNITED STATES PATENT AND TRADEMARK OFFICE
CERTIFICATE OF CORRECTION

PATENT NO.: 6,055,064
DATED: April 25, 2000
INVENTOR(S): Lior LIFSHITZ et al It is certified that error appears in the above-identified patent and that said Letters Patent is hereby corrected as shown below:

- on Title Page, add: Continuation-In-Part of S/N 08/330,851 filed October 27, 1994, now U.S. Patent 5,752,057 issued May 12, 1998.

Signed and Sealed this

Twenty-ninth Day of May, 2001

*Attest:*

NICHOLAS P. GODICI

*Attesting Officer*    *Acting Director of the United States Patent and Trademark Office*